US008818624B2

(12) United States Patent
Small et al.

(10) Patent No.: US 8,818,624 B2
(45) Date of Patent: Aug. 26, 2014

(54) ADAPTIVE SOFT BUTTONS FOR A VEHICLE USER INTERFACE

(75) Inventors: Evan Small, Palo Alto, CA (US); Michael Fairman, Santa Cruz, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 592 days.

(21) Appl. No.: 12/868,515

(22) Filed: Aug. 25, 2010

(65) Prior Publication Data

US 2011/0082619 A1 Apr. 7, 2011

Related U.S. Application Data

(63) Continuation-in-part of application No. 12/725,391, filed on Mar. 16, 2010, which is a continuation-in-part of application No. 12/708,547, filed on Feb. 19, 2010, now Pat. No. 8,078,359.

(60) Provisional application No. 61/278,337, filed on Oct. 5, 2010.

(51) Int. Cl.
| | |
|---|---|
| G06F 7/00 | (2006.01) |
| G06F 17/00 | (2006.01) |
| B60K 37/06 | (2006.01) |
| B60K 35/00 | (2006.01) |
| G01C 21/36 | (2006.01) |
| G06F 3/0488 | (2013.01) |

(52) U.S. Cl.
CPC ........... *B60K 37/06* (2013.01); *B60K 2350/962* (2013.01); *B60K 35/00* (2013.01); *G01C 21/3664* (2013.01); *G06F 3/04886* (2013.01); B60K 2350/1028 (2013.01); B60K 2350/1024 (2013.01)
USPC ................. 701/36; 701/48; 701/487; 715/702

(58) Field of Classification Search
CPC ................... B60K 35/00; B60K 37/06; B60K 2350/1024; B60K 2350/962; B60K 2350/1028; G06F 21/10; G06F 2221/0711; G06F 3/016; G06F 3/0414; G06F 3/04886; G06F 3/04883; G06F 2203/014; G01C 21/3664; H03J 1/0025; G08G 1/0962; G07C 5/0891; G07C 5/008

USPC ............... 701/36, 45, 49, 415, 418, 423, 487; 340/438, 440, 459, 461; 715/702, 708, 715/744–747, 764–765, 768, 864
See application file for complete search history.

(56) References Cited

U.S. PATENT DOCUMENTS

| | | | |
|---|---|---|---|
| 5,555,502 | A | 9/1996 | Opel |
| 5,859,628 | A | 1/1999 | Ross et al. |

(Continued)

FOREIGN PATENT DOCUMENTS

| | | | |
|---|---|---|---|
| EP | 1065413 A1 | 1/2001 | |
| EP | 1420333 A2 | 5/2004 | |

(Continued)

OTHER PUBLICATIONS http://windows/microsoft.com/en-us/windows7/Arrange-windows-side-by-side-on-the-desktop-using-Snap archived Jun. 29, 2009 on http://www.archive.org/web/web.php.

(Continued)

*Primary Examiner* — Khoi Tran
*Assistant Examiner* — Bao Long T Nguyen
(74) *Attorney, Agent, or Firm* — J. Richard Soderberg

(57) ABSTRACT

A system and a method are provided for configuring the touch-sensitive area and/or the tap duration associated with a plurality of touch-sensitive soft buttons of a vehicle user interface in response to varying vehicle conditions. In particular, as a monitored vehicle condition deteriorates, the system controller coupled to the vehicle user interface expands the touch-sensitive region and/or increases the tap duration of the touch-sensitive soft buttons, thereby improving the user's ability to successfully interact with the interface. Vehicle conditions that may be monitored and used to configure the touch-sensitive area and/or tap duration include passenger cabin vibration levels, vehicle speed, turn radius, lateral force levels, precipitation levels and external ambient temperature.

42 Claims, 16 Drawing Sheets

(56) References Cited

U.S. PATENT DOCUMENTS

| | | | |
|---|---|---|---|
| 6,298,305 B1 | 10/2001 | Kadaba et al. | |
| 6,308,203 B1 | 10/2001 | Itabashi et al. | |
| 6,356,812 B1 * | 3/2002 | Cragun | 701/1 |
| 6,374,173 B1 | 4/2002 | Ehlbeck | |
| 6,650,345 B1 | 11/2003 | Saito et al. | |
| 6,771,063 B2 | 8/2004 | Stolfus | |
| 6,775,603 B2 | 8/2004 | Yester et al. | |
| 6,819,990 B2 | 11/2004 | Ichinose | |
| 6,859,687 B2 | 2/2005 | Obradovich et al. | |
| 6,898,501 B2 * | 5/2005 | Schubert | 701/50 |
| 6,956,470 B1 | 10/2005 | Heise et al. | |
| 7,043,699 B2 | 5/2006 | Obradovich | |
| 7,292,228 B2 | 11/2007 | Nagasaka et al. | |
| 7,415,352 B2 * | 8/2008 | Olcott | 701/400 |
| 7,489,303 B1 | 2/2009 | Pryor | |
| 7,561,966 B2 * | 7/2009 | Nakamura et al. | 701/438 |
| 7,683,771 B1 | 3/2010 | Loeb | |
| 7,698,033 B2 | 4/2010 | Hering et al. | |
| 7,730,401 B2 | 6/2010 | Gillespie et al. | |
| 7,797,093 B2 * | 9/2010 | Tsukasaki et al. | 701/70 |
| 7,853,366 B2 | 12/2010 | Imura et al. | |
| 7,978,056 B2 | 7/2011 | Mercurio et al. | |
| 8,131,319 B2 * | 3/2012 | Platzer | 455/566 |
| 8,188,887 B2 | 5/2012 | Catten et al. | |
| 8,566,045 B2 | 10/2013 | Shaffer et al. | |
| 2002/0177944 A1 | 11/2002 | Ihara et al. | |
| 2003/0200012 A1 * | 10/2003 | Odinak et al. | 701/1 |
| 2003/0220722 A1 | 11/2003 | Toba et al. | |
| 2005/0143884 A1 | 6/2005 | Bihler et al. | |
| 2005/0225539 A1 * | 10/2005 | Prados | 345/173 |
| 2005/0261815 A1 | 11/2005 | Cowelchuk et al. | |
| 2006/0017552 A1 | 1/2006 | Andreasen et al. | |
| 2006/0022955 A1 | 2/2006 | Kennedy | |
| 2006/0026535 A1 | 2/2006 | Hotelling et al. | |
| 2006/0028453 A1 | 2/2006 | Kawabe | |
| 2006/0146039 A1 * | 7/2006 | Prados et al. | 345/173 |
| 2006/0155431 A1 | 7/2006 | Berg | |
| 2006/0155445 A1 | 7/2006 | Browne et al. | |
| 2006/0161871 A1 | 7/2006 | Hotelling et al. | |
| 2006/0247834 A1 * | 11/2006 | Shimazaki | 701/36 |
| 2006/0277495 A1 | 12/2006 | Obradovich | |
| 2007/0124043 A1 * | 5/2007 | Ayoub et al. | 701/36 |
| 2007/0176797 A1 | 8/2007 | Rhodes et al. | |
| 2007/0262953 A1 | 11/2007 | Zackschewski | |
| 2007/0262965 A1 | 11/2007 | Hirai et al. | |
| 2008/0036743 A1 | 2/2008 | Westerman et al. | |
| 2008/0082920 A1 | 4/2008 | Eom | |
| 2008/0122798 A1 | 5/2008 | Koshiyama et al. | |
| 2008/0177458 A1 | 7/2008 | Malone et al. | |
| 2008/0211779 A1 | 9/2008 | Pryor | |
| 2008/0243373 A1 | 10/2008 | Cat et al. | |
| 2008/0282173 A1 | 11/2008 | Kim et al. | |
| 2009/0021491 A1 | 1/2009 | Kawamura | |
| 2009/0144661 A1 | 6/2009 | Nakajima et al. | |
| 2009/0174677 A1 | 7/2009 | Gehani et al. | |
| 2009/0210110 A1 | 8/2009 | Dybalski et al. | |
| 2009/0244016 A1 | 10/2009 | Casparian et al. | |
| 2009/0259969 A1 | 10/2009 | Pallakoff | |
| 2009/0315848 A1 | 12/2009 | Ku et al. | |
| 2010/0070932 A1 | 3/2010 | Hur | |
| 2010/0088632 A1 | 4/2010 | Knowles et al. | |
| 2010/0095245 A1 | 4/2010 | Fino et al. | |
| 2010/0271385 A1 | 10/2010 | Lan et al. | |
| 2010/0318266 A1 | 12/2010 | Schaaf et al. | |
| 2011/0001722 A1 | 1/2011 | Newman et al. | |
| 2011/0035700 A1 | 2/2011 | Meaney et al. | |

FOREIGN PATENT DOCUMENTS

| | | |
|---|---|---|
| EP | 1 702 805 A1 | 9/2006 |
| EP | 2 050 610 A1 | 4/2009 |
| JP | 2003-146055 | 5/2003 |
| JP | 2007-030633 | 2/2007 |
| JP | 2008-285046 | 11/2008 |
| JP | 2008-292219 | 12/2008 |
| JP | 2009-057013 | 3/2009 |
| WO | 03/039914 A1 | 5/2003 |
| WO | 2004/081777 | 9/2004 |

OTHER PUBLICATIONS slide.pdf (slide-definition of slide by the Free Online Dictionary, Thesaurus and Encyclopedia, Oct. 30, 2013, Free Online Dictionary, pp. 1-5).

swipe.pdf (swipe — definition of swipe by the Free Online Dictionary, Thesaurus and Encyclopedia, Oct. 31, 2013, Free Online Dictionary, pp. 1-5).

* cited by examiner

ADAPTIVE SOFT BUTTONS FOR A VEHICLE USER INTERFACE

CROSS-REFERENCE TO RELATED APPLICATION

This application claims the benefit of the filing date of U.S. Provisional Patent Application Ser. No. 61/278,337, filed Oct. 5, 2009, the disclosure of which is incorporated herein by reference for any and all purposes. This application is a continuation-in-part of U.S. patent application Ser. No. 12/725,391, filed Mar. 16, 2010, which is a continuation-in-part of U.S. patent application Ser. No. 12/708,547, filed Feb. 19, 2010, the disclosures of which are incorporated herein by reference for any and all purposes.

FIELD OF THE INVENTION

The present invention relates generally to a user interface and, more particularly, to a vehicle user interface that adapts to changing vehicle conditions.

BACKGROUND OF THE INVENTION

A conventional vehicle includes various systems that allow the user, i.e., the driver or passenger, a means of interfacing with the vehicle, specifically providing a means for monitoring vehicle conditions and controlling various vehicle functions. Depending upon the complexity of the systems to be monitored and/or controlled, such a user interface may utilize visual, tactile and/or audible feedback, and may be comprised of multiple interfaces, each interface grouping together those controls necessary to monitor and/or operate a specific vehicle subsystem (e.g., HVAC, entertainment, navigation, etc.).

The past few decades have seen a dramatic shift in the design and composition of a typical vehicle interface, this shift being driven in part due to the ever-increasing complexity of vehicle subsystems and in part by the migration of computer-oriented interfaces, such as touch-screens, to the vehicle. As a result of this shift, the user is given much more control over their vehicle and its subsystems. Unfortunately this added control often comes at the cost of interface simplicity which, in turn, may lead to the development of unsafe driving habits due to increased driver distraction during operation of the interface. Additionally, the loss of interface simplicity, or the use of an interface that is poorly designed or counter-intuitive, may lead to user frustration and dissatisfaction.

To insure driver and passenger safety, vehicle control systems are preferably designed to be intuitive. Additionally, common vehicle interfaces that control a safety-related vehicle subsystem (e.g., lights, windshield wipers, etc.) are typically designed to insure driver familiarity, for example by locating a particular control system in the same general location regardless of manufacturer. For instance, most cars use either a rotating switch or a stalk-mounted switch, mounted to the left side of the steering wheel, to operate the headlights and parking lights. Similarly, most cars use a stalk-mounted switch to the right of the steering wheel to operate the windshield wipers. Although less critical, vehicle system monitors such as the speedometer or tachometer may also be mounted in similar locations by multiple manufacturers, thereby providing the driver with a familiar setting. Unlike the primary control systems, however, the user interfaces for the auxiliary vehicle systems are often the subject of substantial design innovation as different car manufacturers try to achieve an interface that is novel, intuitive and preferably relatively simple to operate. Often times a manufacturer will try to distinguish their vehicles from those of other manufacturers partially based on such an interface. Conversely, a poorly designed interface may be used by the competition to ridicule and devalue a particular vehicle.

While conventional vehicles provide a variety of devices and techniques for the driver and/or passenger to control and monitor the vehicle's various subsystems and functions, typically the end user is given no ability to modify or customize the interface to meet their particular needs and usage patterns. Additionally, other than for changing the interface appearance in response to varying light conditions, a typical vehicle user interface does not adapt to changing conditions. As a result, an interface that may work extremely well under one set of conditions, e.g., parked in the day, may work quite poorly under a different set of conditions, e.g., driving at a high speed along a windy road at night. Accordingly, what is needed is a vehicle user interface that automatically changes with changing conditions, thus improving subsystem control during non-optimal driving conditions. The present invention provides such a user interface.

SUMMARY OF THE INVENTION

The present invention provides a system and a method for configuring the touch-sensitive area and/or the tap duration associated with a plurality of touch-sensitive soft buttons of a vehicle user interface in response to varying vehicle conditions. In particular, as a monitored vehicle condition deteriorates, the system controller coupled to the vehicle user interface expands the touch-sensitive region and/or increases the tap duration of the touch-sensitive soft buttons, thereby improving the user's ability to successfully interact with the interface. Expanded touch-sensitive regions may be visible or transparent on the vehicle user interface. Expansion of the touch-sensitive region and/or increasing the tap duration may be done in stages, the stages dependent upon the level of deterioration of the vehicle/interface operating conditions. Sensors that may be used to monitor varying vehicle conditions include vibration sensors, steering wheel position sensors, wheel position sensors, lateral force sensors, vehicle speed sensors, precipitation sensors and external ambient temperature sensors. Vehicle conditions that may be monitored and used to configure the touch-sensitive area and/or tap duration include passenger cabin vibration levels, vehicle speed, turn radius, lateral force levels, precipitation levels and external ambient temperature.

A further understanding of the nature and advantages of the present invention may be realized by reference to the remaining portions of the specification and the drawings.

DESCRIPTION OF THE SPECIFIC EMBODIMENTS

There are a variety of factors that influence how well a particular user is able to interact with a particular user interface. In addition to the type of controls used by the interface (e.g., touch, voice command, etc.), these factors include both external and internal vehicle conditions as well as conditions that are or are not within the control of the driver. External vehicle conditions that are primarily outside the control of the user include lighting (e.g., day time, night time, night time with nearby high intensity city lighting, night time with little or no additional lighting, etc.), audio levels (e.g., road noise, wind noise, nearby construction, etc.), weather (e.g., rain, fog, snow, sleet, etc.) and driving conditions (e.g., paved road, gravel road, bumpy road, windy road, etc.). External vehicle conditions that are at least partially under the control of the driver include road selection and driving speed for a given set of road conditions. To a large extent, conditions within the vehicle are under the control of the driver, such conditions including lighting (e.g., passenger compartment lighting) and audio levels (e.g., volume levels for the vehicle's entertainment system).

The present invention provides a means for a vehicle user interface to actively adapt to changing conditions, thereby providing the user with a safer, more intuitive, easier-to-use interface regardless of the conditions in which the driver and/or passenger finds themselves. Preferably each aspect of the vehicle user interface, also referred to herein as simply the user interface, is optimized assuming few, if any, distractions. As previously noted, exemplary distractions include non-optimal lighting, driving conditions, weather, noise, etc. The system of the invention is designed to monitor some, or all, of these conditions and vary the interface in response to the monitored conditions. For clarity, in the following description each of these conditions and the preferred way in which the user interface adapts to the monitored condition is discussed individually. It should be appreciated, however, that a single interface may be configured to adapt to multiple changing conditions.

Figure 1:
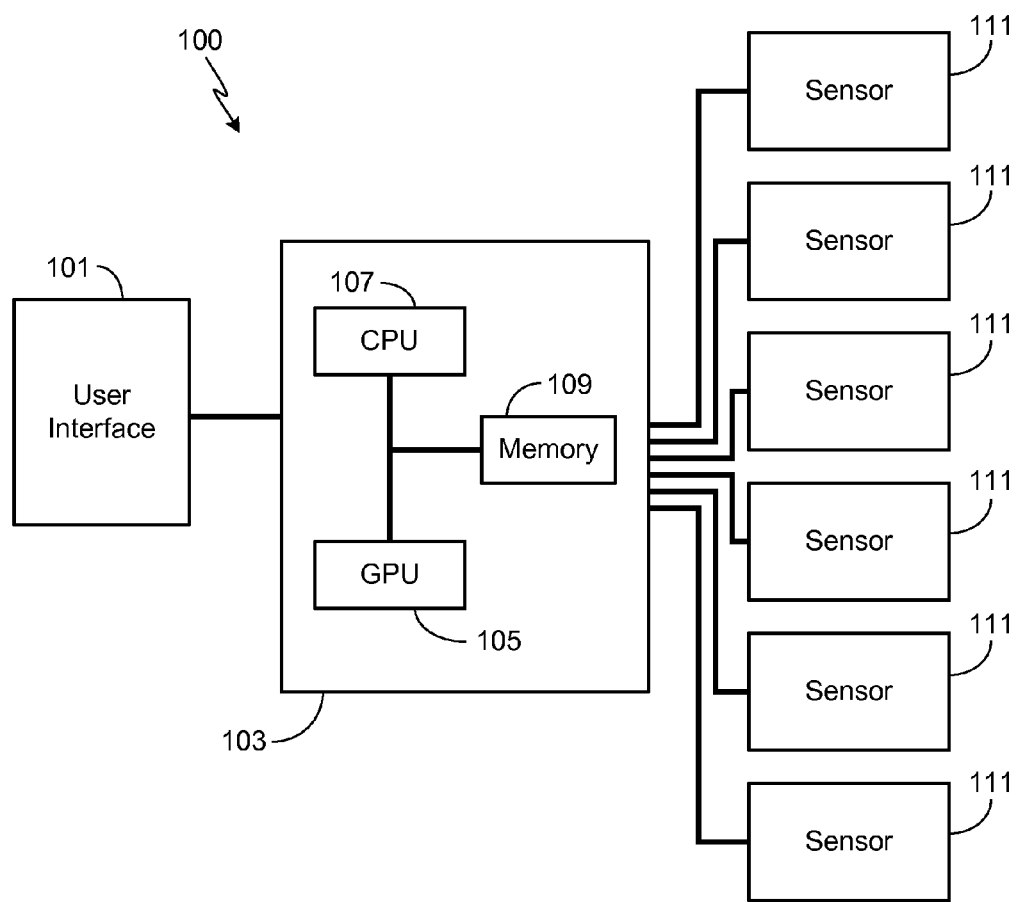
FIG. 1 is a block diagram of the primary subsystems and components involved in a preferred embodiment of the invention.

FIG. 1 is a block diagram of the primary subsystems and components involved in a preferred embodiment of the invention for use in a vehicle. While the intended vehicle is preferably a car, and more preferably an electric or hybrid car, it will be appreciated that the present invention can be used, and is useful, in any vehicle in which the driver and/or passenger may be subjected to varying audio, visual or tactile distractions while attempting to operate the vehicle's user interface. Accordingly, in addition to automobiles, the present invention may be used with motorbikes, boats, planes, off-road vehicles, etc. Additionally, it will be appreciated that other system configurations may be utilized while still retaining the functionality of the present invention. Lastly, it should be understood that one or more of the elements shown in FIG. 1 can be grouped together in a single device, and/or circuit board, and/or integrated circuit.

As shown, system 100 includes a user interface 101. Although user interface 101 is shown as a single interface, for example, a single touch-screen as preferred, it should be understood that interface 101 may be comprised of multiple interfaces (e.g., multiple touch-screens, each configured to provide the user with an interface for one or more specific vehicle subsystems). Additionally, interface 101 may include a single type of interface, or multiple interface types (e.g., audio and visual).

Coupled to user interface 101 is a system controller 103. Preferably controller 103 includes a graphical processing unit (GPU) 105, a central processing unit (CPU) 107, and memory 109. CPU 107 and GPU 105 may be separate or contained on a single chip set. Memory 109 may be comprised of EPROM, EEPROM, flash memory, RAM, a solid state disk drive, a hard disk drive, or any other memory type or combination of memory types. Controller 103 may be separate from, or integrated with, user interface 101. Coupled to controller 103 are one or more condition sensors 111, sensors 111 configured to monitor the conditions in question. As such, and as described in detail below, sensors 111 may include one or more of audio sensors, light sensors, accelerometers, velocity sensors, temperature sensors, etc.

Figure 2:
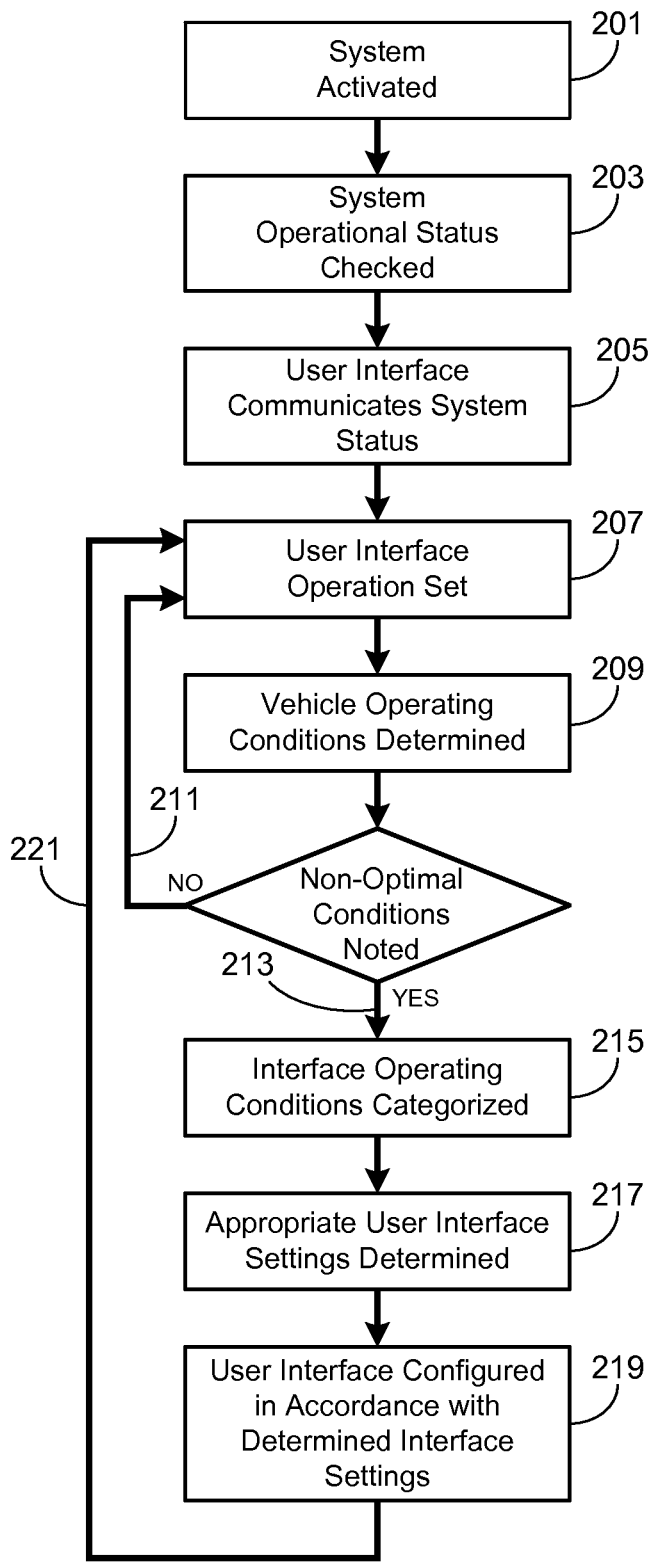
FIG. 2 illustrates the basic methodology of the invention.

FIG. 2 illustrates the basic methodology of the invention. The first step is to initiate system operation (step 201). Typically this step occurs when the user turns on the vehicle, for example by turning a key to the "on" position, pressing the vehicle "on" button, or otherwise initiating vehicle operation. During the initiation cycle, the vehicle may go through an internal system check in which the operational status of one or more vehicle subsystems will be determined in order to insure that the vehicle is ready for operation (step 203). While the operational status of the vehicle is being verified by the system, the user interface may or may not display various messages to the user, for example notifying the user of the operational status of the vehicle and/or various vehicle subsystems (step 205). Once the system determines that it is operational, the user interface is set (step 207), for example displaying various subsystem information and controls based on a predefined format. The predefined format may be preset by the vehicle manufacturer, by a service representative of the vehicle manufacturer, by the user, or by a third party (e.g., technician).

Preferably when the system becomes fully operational, the user interface displays information, and interacts with the driver and/or passenger, based on optimal operating conditions, e.g., the vehicle parked with minimal audible, visual or tactile distractions. After this point, the system periodically monitors vehicle operating conditions (209) using one or more sensors as previously noted and as described in detail below. The frequency of monitoring step 209 may be on the order of minutes, seconds, milliseconds, or some other time period. Additionally, the system may be set-up to monitor different operating conditions with different frequencies. For example, weather conditions (e.g., precipitation and/or ambient temperature, etc.) may be monitored on the order of every minute, road conditions (e.g., incline, road bumpiness, etc.) may be monitored on the order of every second, and driving conditions (e.g., vehicle speed, steering wheel position, etc.) may be monitored on the order of every millisecond. The system may also be set-up to monitor conditions using a threshold-based system, i.e., where certain conditions will trigger changes with the user interface. For example, the system may have an audio volume threshold level for inside the passenger cabin, and/or one or more speed thresholds, etc.

The results of monitoring step 209 are compared to a preset set of operating conditions. If the interface operating conditions remain optimal, or within a range deemed optimal, then the system loops back (step 211) and continues to monitor conditions. If the interface operating conditions are determined to be sufficiently changed (step 213) to warrant one or more changes to the user interface, then interface operating conditions must be categorized (step 215). In this step, the severity of the interface operating condition(s) is determined. Typically step 215 is implemented using a look-up table. For example, a vehicle speed of 0-15 MPH may be categorized as level 0 (e.g., optimal); 15-30 MPH categorized as level 1; 30-60 MPH categorized as level 2; 60-80 MPH categorized as level 3; and anything above 80 MPH as level 4, where increasing level corresponds to decreasing interface operating conditions. In at least one preferred embodiment, in step 215 system controller implements an algorithm that determines the category based on all of the monitored conditions combined. For example, while a vehicle speed of 15-30 MPH may equate to level 1, and light precipitation may equate to level 1, the combination of a vehicle speed of 15-30 MPH with light precipitation may equate to level 2. Similarly, while executing a turn with a turning radius of 50 feet may equate to a level 1, the combination of a vehicle speed of 15-30 MPH with light precipitation while turning with a turning radius of 50 feet may equate to a level 3.

Once the interface operating conditions are categorized, the output of this step is compared to a preset set of interface configurations (step 217). This step is typically performed using a look-up table, for example stored in memory 109, where each possible operating condition category corresponds to a specific set of interface adaptations. The appropriate set of interface adaptations is then implemented (step 219). Loop 221 insures that throughout vehicle operation, the system is continually being updated, thereby insuring that the appropriate user interface settings are used.

In the preferred embodiment, the user interface is capable of a variety of interface adaptations, the extent of these adaptations being dependent upon the level of deterioration of the interface operating conditions. However, in at least one alternate embodiment, the interface is capable of only two settings; optimal and non-optimal. In the optimal configuration it is assumed that there are few, if any, driver/passenger distractions, thus allowing the user to devote their attention to accessing and using the vehicle interface. The non-optimal configuration is used when the driver/passenger may be distracted due to road conditions, weather conditions, etc., regardless of the severity of these distractions.

Figure 3:
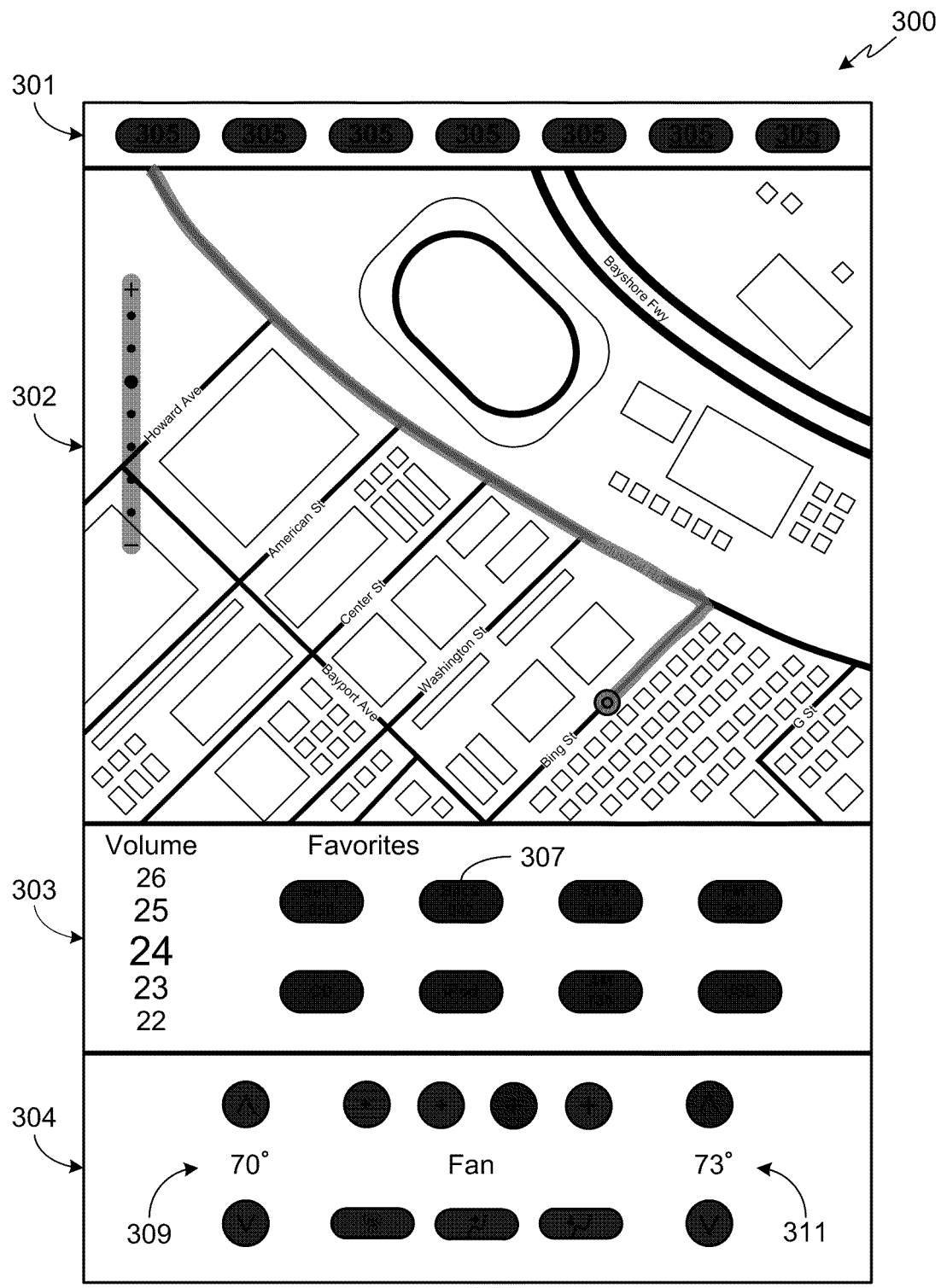
FIG. 3 illustrates an exemplary touch-screen user interface for use with the invention.
Figure 4:
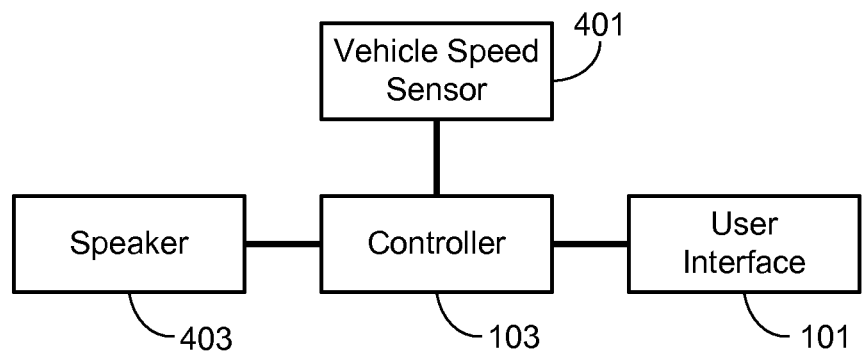
FIG. 4 is a block diagram of a user interface with adaptive audible feedback.
Figure 5:
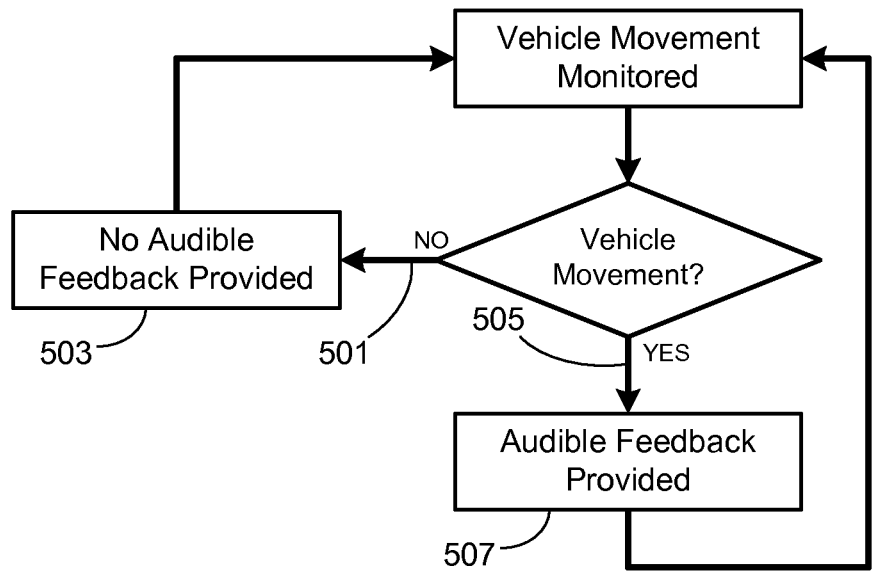
FIG. 5 illustrates the methodology associated with an adaptive audible feedback interface.

While the present invention may be used with a variety of different interface types, the preferred interface is a touch-screen due to the flexibility that such an interface offers. FIG. 3 illustrates an exemplary touch-screen 300, although it should be understood that an interface for use with the invention is not limited to this screen configuration and/or controls, and that interface 300 is only intended to illustrate a possible set of controls and interface configuration.

Touch-screen 300 is preferably divided into multiple zones, each zone directed at a particular subsystem interface. A detailed description of a configurable, multi-zone touch-screen interface is given in co-pending U.S. patent application Ser. No. 12/708,547, filed Feb. 19, 2010, the disclosure of which is incorporated herein for any and all purposes.

In touch-screen 300, the display is divided into four zones 301-304. Touch-screen 300 may, however, be divided into a fewer, or greater, number of zones. As shown, uppermost zone 301 is comprised of one or more soft buttons 305. Soft buttons 305 may be used to provide the user with access to general display control settings. Alternately, soft buttons 305 may be configured to provide the user with rapid access to frequently used interface functions, for example, direct access to specific subsystems (e.g., general set-up, climate control subsystem, audio subsystem, mobile/cell phone interface, navigation subsystem, drive train monitoring interface, battery charging subsystem interface, web browser, back-up and/or forward view camera, etc.). In addition to soft buttons 305, or as an alternate to soft buttons 305, zone 301 may be used to display system information, e.g., status of various subsystems, etc. As used herein, a soft button refers to a pre-defined, touch-sensitive region of display 300 that activates or otherwise controls a function in a manner similar to that of a hard button (i.e., a toggle switch, a push button, etc.). As soft buttons are well known in the art, further description will not be provided herein.

In illustrated touch-screen 300, in addition to zone 301, the screen includes a navigation zone 302, an entertainment zone 303, and a passenger cabin climate control zone 304. It will be appreciated that these zones may be of different size and proportions than shown, and may be configured to display other subsystem information (e.g., a web browser) than shown. Each zone includes various controls that correspond to the displayed subsystem. For example, navigation zone 302 may include address input controls, zoom controls, route controls, etc.; entertainment zone 303 may include volume controls, input selection controls, broadcast station controls, tone controls, etc.; and climate control zone 304 may include temperature controls, fan controls, defroster controls, vent controls, etc.

As described briefly above, and in detail below, the present invention simplifies user/interface interaction by altering various aspects of the interface as ambient and vehicle conditions change. Clearly the aspects of the vehicle interface that change depend, at least in part, on the configuration of the vehicle interface as well as the capabilities of the vehicle itself.

In at least one embodiment, the user is able to set-up the ways in which the user interface adapts to changing ambient and vehicle conditions. This form of customization allows the system to be adapted to match the particular preferences and capabilities of the end user which may vary depending upon driver/user age, reflexes, training, etc.

Exemplary Vehicle Interface Adaptive States

Adaptive Audible Feedback

When a vehicle is parked, the user (driver/passenger) is able to devote their full attention to the vehicle's user interface, specifically looking at the interface as they modify or adjust the controls (e.g., cabin heating/cooling/ventilation system, entertainment system, etc.). In contrast, when the vehicle is moving, the driver, and to a limited extent the passenger, must focus a large portion of their visual attention on the task of driving, in particular traffic conditions, road conditions, direction of travel, other vehicles, etc. As a result, when the vehicle is moving the user is no longer able to rely as strongly, nor for extended periods of time, on visual cues when interacting with the interface.

In at least one preferred embodiment of the invention, illustrated in FIGS. 4-9, the system includes a vehicle speed sensor 401. Vehicle speed sensor 401 may be a transmission/gear sensor that senses whether the vehicle is in park or drive. Alternately, speed sensor 401 may sense vehicle movement, for example by monitoring motor, wheel or axle rotation.

When the vehicle is not moving (step 501) as sensed by sensor 401 and determined by system controller 103, preferably user interface 101 does not utilize audible feedback when the user inputs data via user interface 101 (step 503). Thus, for example, when the user changes the audio channel by pressing soft button 307 (FIG. 3), there is no audible feedback that allows the user to know that they have made contact with soft button 307. When sensor 401 senses vehicle movement (step 505), as determined by system controller 103, the interface adapts to this change in condition by providing the user with an audible feedback cue (step 507) via a speaker 403 when a soft button is pressed (e.g., soft button 307). The audible feedback cue may be a click, tone, or other audible sound. By providing the user with audible feedback, the user knows that they pressed the soft button and that their touch registered with the system. Such feedback is very beneficial when the user's attentions are diverted elsewhere.

Preferably the system uses the vehicle's audio entertainment system, more specifically the speakers associated with the entertainment system, for speaker 403. Alternately, speaker 403 may be a dedicated speaker.

Figure 6:
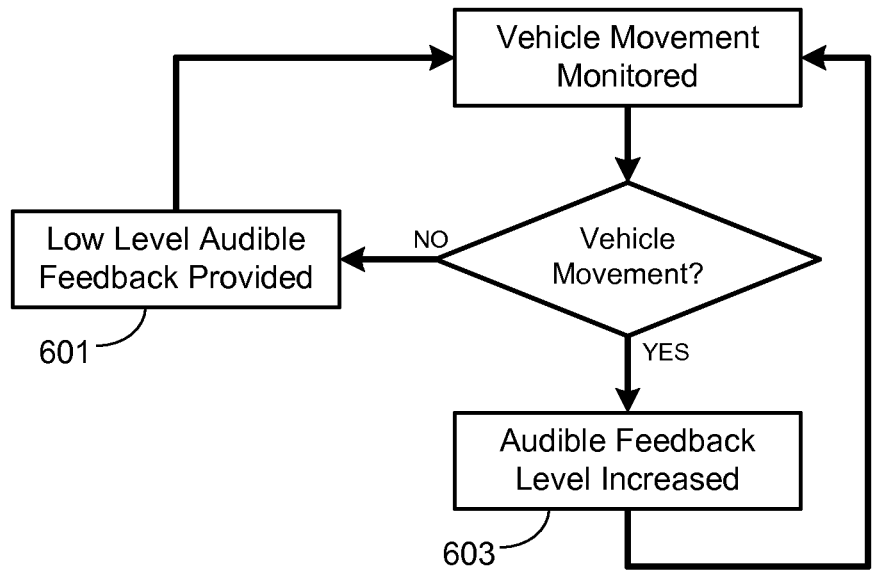
FIG. 6 illustrates an alternate methodology for use with an adaptive audible feedback interface.

In at least one embodiment, illustrated in FIG. 6, the user interface always provides audible feedback cues (step 601) when user input is registered, i.e., when a soft button is touched. However, in this embodiment when vehicle movement is sensed, the volume level of the audible feedback cue increases (step 603). Preferably the system allows the user to set the feedback volume levels for both vehicle conditions, i.e., non-movement and movement.

It will be appreciated that while in the preferred embodiment vehicle movement is used as the condition that controls the audio feedback level, other conditions may be used. For example, in a modification of this system, sensor 401 simply senses whether or not the vehicle is in park. If the vehicle is not in park, i.e., it is in a forward or reverse gear, then audible feedback is provided to the user, or a higher feedback volume level is used, during interface interaction. Alternately, the system may provide audible feedback at a predetermined speed rather than the onset of any vehicle movement. For example, the user, vehicle manufacturer, or third party may set the speed at which audible feedback (or a higher volume level for the feedback) is provided to the user during interface interaction. The speed may be 5 MPH, 10 MPH, 20 MPH, 30 MPH or any other preselected speed. This embodiment of the system is based on the assumption that at very low speeds the user is still able to devote sufficient attention to the interface to not require audible feedback, and as such, audible feedback is only needed at higher vehicle speeds when the user is distracted.

Figure 7:
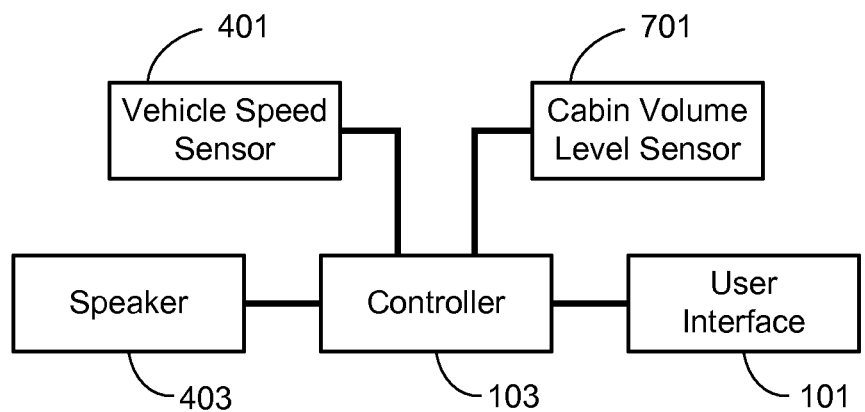
FIG. 7 is a block diagram of an alternate adaptive audible feedback interface.
Figure 8:
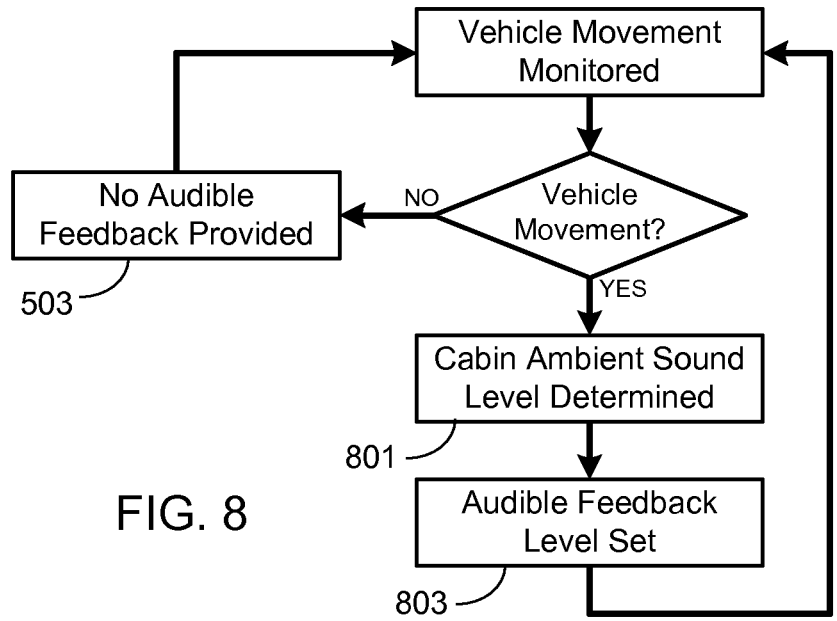
FIG. 8 illustrates the methodology for use with the interface shown in FIG. 7.
Figure 9:
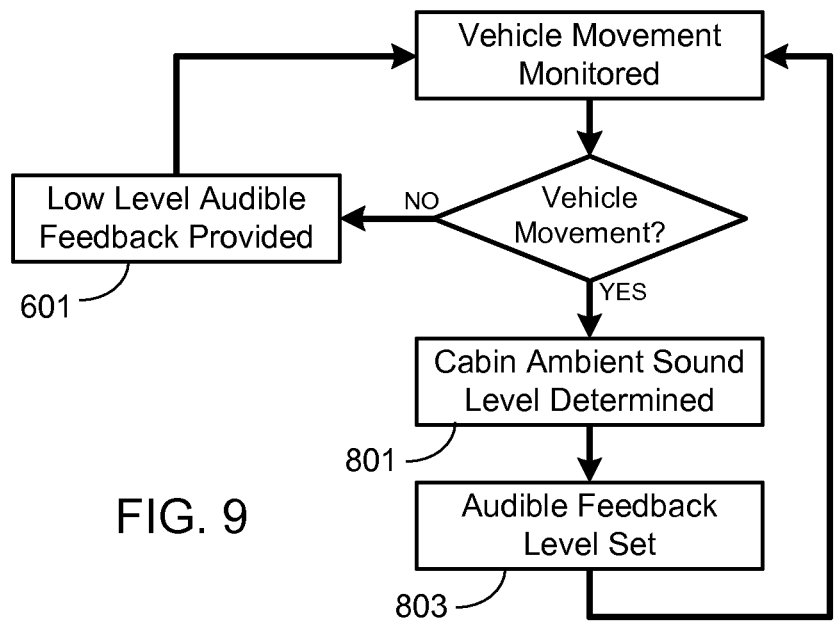
FIG. 9 illustrates an alternate methodology for use with the interface shown in FIG. 7.

In a modification of the previously described embodiment, and as illustrated in FIGS. 7-9, in addition to a speed sensor 401, the system also includes a sensor 701 that monitors the sound level within the vehicle's passenger cabin. Speed sensor 401 operates as previously described, i.e., monitoring vehicle speed using a gear sensor (e.g., 'park' versus 'drive'), motor rotation speed sensor, wheel rotation speed sensor, axle rotation speed sensor, etc., to determine whether the vehicle is moving and/or at what speed the vehicle is moving. Sensor 701 is used to set the volume level of the audible feedback, thus insuring that the feedback volume is of sufficient volume to be easily heard by the user during interface interaction.

FIGS. 8 and 9 illustrate the methodology used with the interface shown in FIG. 7, with and without low level audible feedback being provided when the vehicle is parked. During operation, after system controller 103 determines that the vehicle is moving, or the vehicle speed has exceeded the preset speed required to provide increased audible feedback during interface interaction, the system controller determines the sound level within the vehicle cabin (step 801). Then the system controller sets the volume level for interface feedback to a level sufficient to be heard over the pre-existing sounds within the vehicle (step 803). This embodiment insures that regardless of the ambient sound level, the user will still be able to effectively interact with user interface 101.

Adaptive Soft buttons

In a typical touch-screen interface, each soft button is defined, in part, by the area of the touch-sensitive region provided for that control on the interface. The touch-sensitive region may or may not be the same size as the graphic that is displayed on the interface that represents the soft button. For example, in screen 300, the touch-sensitive region for each soft button associated with the 'Favorites' section of the entertainment zone 303 is illustrated by a shaded portion. In contrast, the volume control in zone 303 does not include any shading. Note that the volume control may be configured to accept tapping input (i.e., tapping on a volume level to select that level and/or tapping above or below the center number to increase/decrease the volume level) and/or to accept a sliding (or swiping) gesture up/down to alter the volume level.

In addition to touch area, there is typically a 'tap' speed associated with each soft button, this speed defining the length of time that the user's finger must be pressed against the soft button in order to register a 'touch'. Thus the tap speed is used to distinguish between intentional and accidental button touches.

This aspect of the invention recognizes that the user has much more control over their interaction with the soft buttons during times of minimal distraction. For example, when the vehicle is parked or traveling at low speeds, the user is able to accurately touch a relatively small region of the screen, and to touch this area at a relatively high tap speed. In contrast, when the user is distracted due to road conditions, or the road conditions are poor (e.g., bumpy road), the user may find it difficult to accurately touch a small region of the screen, and/or to do so at a relatively high tap rate.

Figure 10:
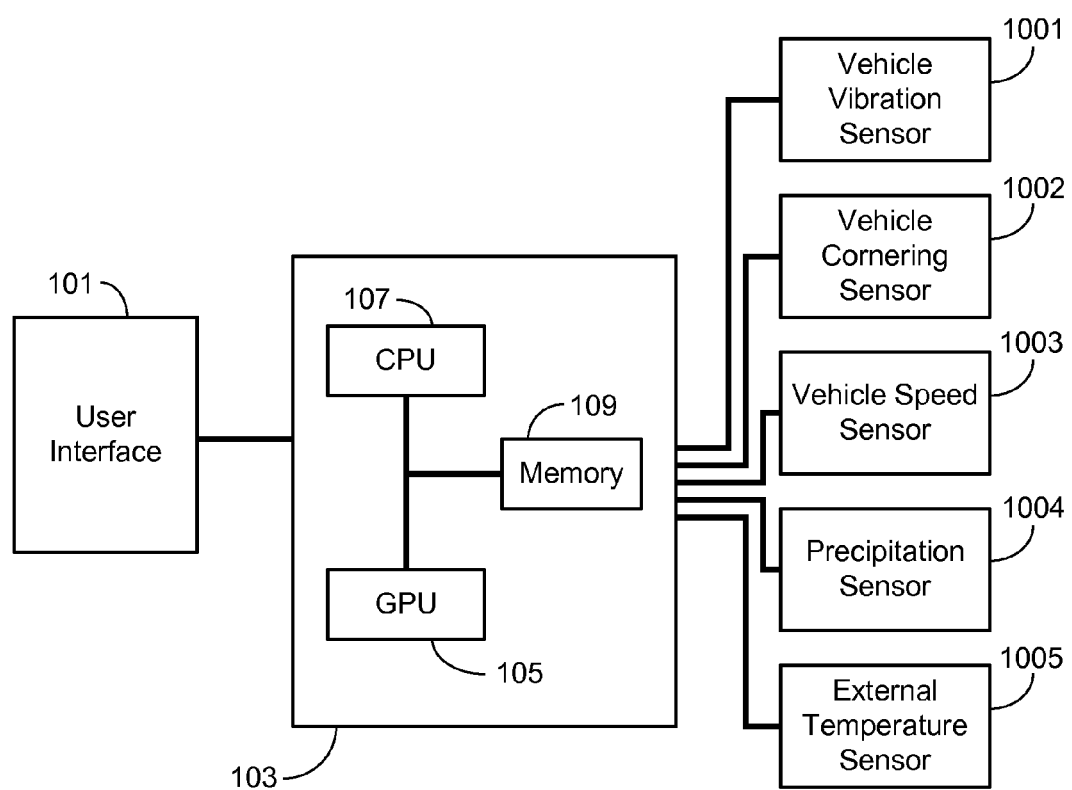
FIG. 10 illustrates a block diagram of an interface using adaptive soft buttons.

Accordingly, in at least one embodiment of the invention, user interface soft buttons, including slider controls such as the volume control, adapt to the vehicle conditions as detected by sensors 105. More particularly, and as illustrated in FIG. 10, system controller 103 is coupled to one or more of a vehicle vibration sensor 1001, a vehicle cornering sensor 1002, and a vehicle speed sensor 1003. System controller 103 may also be coupled to a precipitation sensor 1004 and to an ambient external temperature sensor 1005. While other sensors may be used to sense other vehicle conditions, the inventors have found that the above-identified sensors, or some subset thereof, are adequate to use to adapt the vehicle interface to changing conditions. Each of these sensors will now be described in further detail.

Vibration sensor 1001 monitors the amount of vibration that is transmitted from the road, or from the drive train, to the passenger cabin where the driver/passenger and the user interface are located. As the degree to which road bumpiness and drive train operation impacts the user depends on the various vehicle isolation systems that are used to isolate the cabin from external vibrations (e.g., shock absorbers, vibration isolators, etc.), it will be appreciated that sensor(s) 1001 must be mounted within the passenger cabin, or in a location that experiences the same level of vibration as the passenger cabin. Vibration sensor 1001 is important in this embodiment of the invention as cabin vibrations make it very difficult for the user to accurately touch a specific spot on the interface, and to do so at a relatively high tap rate.

Vehicle cornering sensor 1002 monitors when, and to what degree, the vehicle is driving around a corner. Cornering sensor 1002 may monitor steering wheel position, wheel position, lateral force, or some combination of these qualities. Sensing vehicle cornering is important for several reasons. First, during vehicle cornering, the user is moving the steering wheel away from the neutral position, where the neutral position is defined as the steering wheel position that allows the vehicle to move forward or backward in a straight line. As a result, at least one of the driver's hands is busy moving and controlling the steering wheel. Second, during cornering the driver's attention is primarily directed at the task of cornering, not the task of interacting with the user interface. Third, during vehicle cornering, lateral force is applied to the driver and the passenger, making it more difficult to accurately touch a position on the interface touchscreen. Clearly the greater the lateral force, the greater the difficulty in user-interface interaction. The amount of lateral force depends upon both the vehicle speed and the turn radius.

In at least one embodiment, sensor 1002 is not utilized. The reason for not including a cornering sensor of any type is that in most situations, the driver will not attempt to utilize the user interface during a cornering maneuver, or when the car is experiencing lateral forces without cornering (i.e., during a slide). In some embodiments, however, sensor 802 is included since even during cornering the passenger may still wish to input or otherwise control various vehicle subsystems using the screen interface.

In general, as the vehicle speed increases, the driver must devote more and more attention to the task of driving. As a result, with increasing vehicle speed it becomes increasingly difficult to accurately touch specific regions of the touch-screen, or to touch them at the required tap speed. Accordingly, in at least one embodiment the system includes a vehicle speed sensor 1003 that monitors vehicle speed, for example by monitoring motor rotational speed, wheel rotational speed, or axle rotational speed. System controller 103 converts the monitored rotational speed to a vehicle speed.

During times of rain, especially heavy rain, the driver, and to a lesser extent the passenger, may find it difficult to devote as much time to interacting with the user interface as in times of zero or light precipitation. While precipitation sensor 1004 may simply sense precipitation that exceeds a preset level, preferably sensor 1004 is able to sense the level of precipitation, thus allowing the system to more accurately adapt the user interface to changing weather conditions.

Icy or snowy conditions are even more distracting, and pose a greater risk, than rainfall. Clearly under such weather conditions, even a momentary lapse in attention may result in a loss of vehicle control. Accordingly, if the system includes a precipitation sensor 1004, it preferably also includes an external temperature sensor 1005. If rainfall is detected, system controller 103 is able to determine the likelihood of snowy, or icy, driving conditions, based on the monitored external temperature.

In response to deteriorating driving conditions, or as changing driving conditions make it more difficult for the driver and/or passenger to accurately touch a specific spot on the interface and/or to do so at a relatively high tap rate, the present system adapts the soft buttons to the new vehicle conditions. As described further below, the ways in which the soft buttons adapt may be visible to the user, or completely transparent to the user. In general, transparency is preferred in order to minimize the risk of distracting the user by varying the look of the interface.

Figure 11:
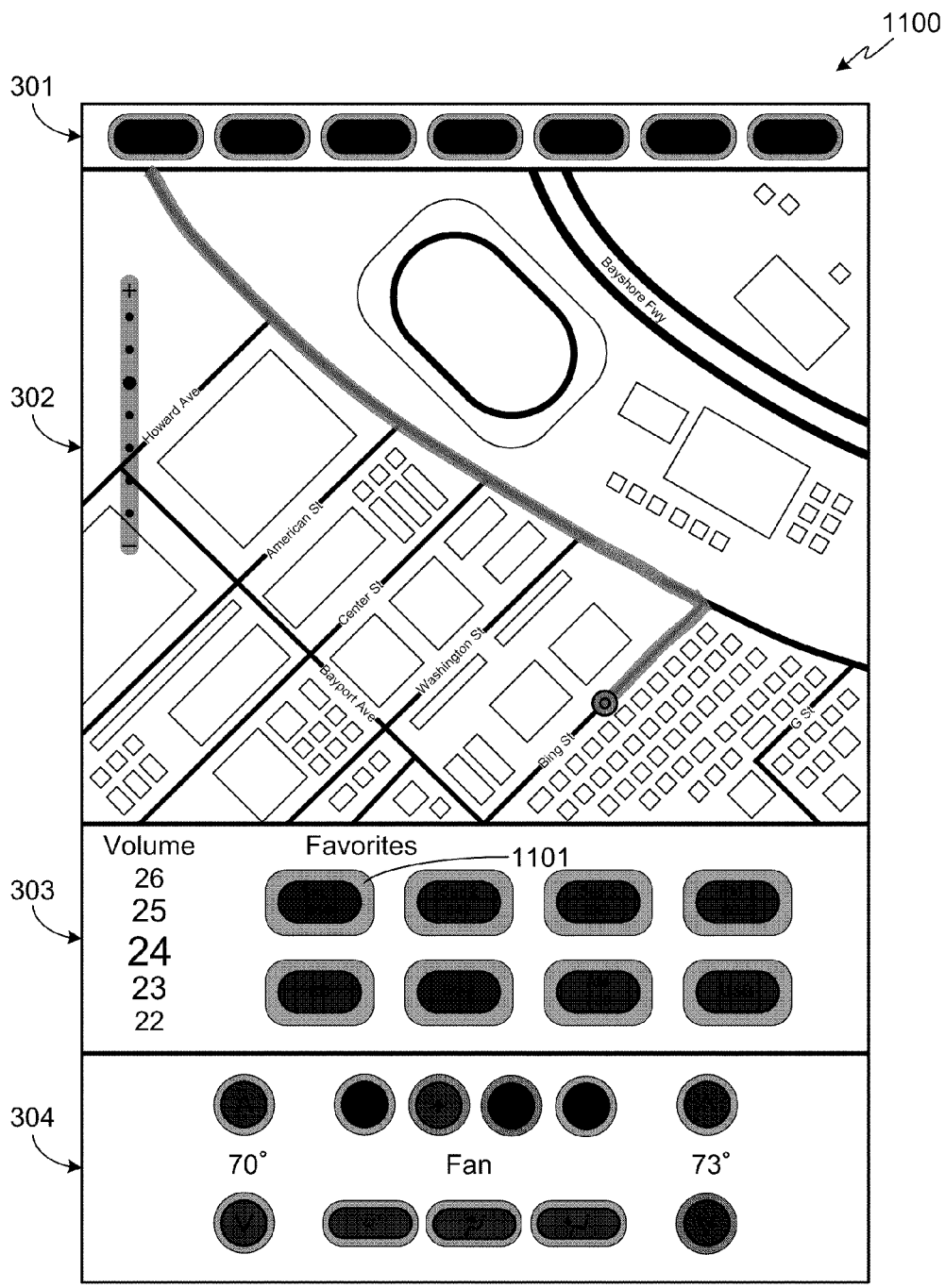
FIG. 11 illustrates the same user interface as shown in FIG. 3, but adapted to compensate for worsening driving conditions.

FIG. 11 illustrates the same user interface as shown in FIG. 3, but adapted to compensate for worsening driving conditions. As shown, the touch area corresponding to each soft button has been significantly increased, thereby making it easier for the user to touch the desired soft button. In FIG. 11, the extended touch sensitive region for each soft button, indicated by shaded region 1101, is not visible to the user. Therefore the user would see the same interface as shown in FIG. 3, but the interface would accept button touches over a much larger region, i.e., region 1101 for each button, than indicated by the displayed button graphics. This allows the user to quickly utilize the user interface, and for the user interface to accurately recognize the user's intended touches, even if the user misses the intended soft button by a small amount.

Figure 12:
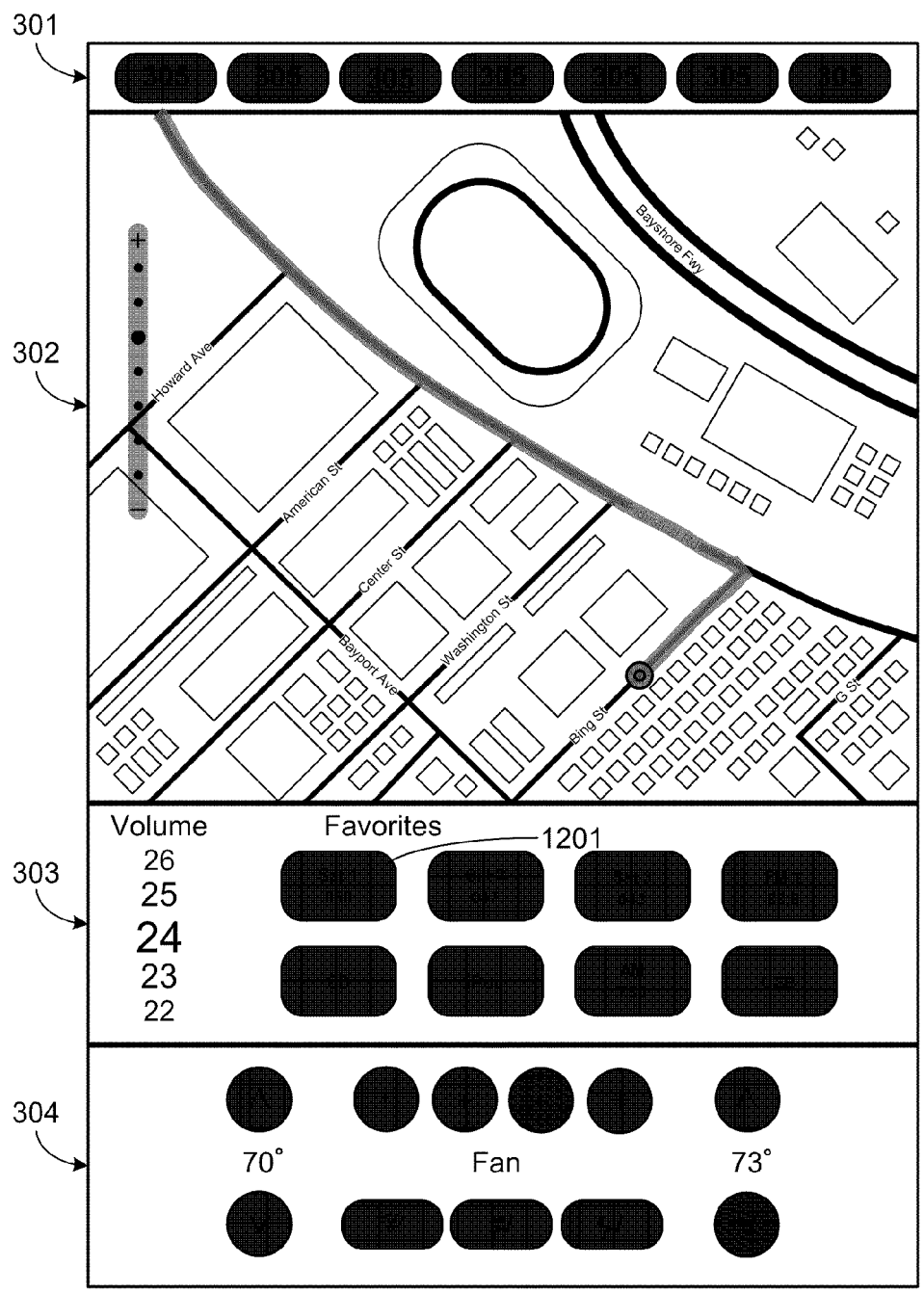
FIG. 12 illustrates the same user interface as shown in FIG. 11, except that the extended touch-sensitive region of each soft button is visible to the user.

FIG. 12 illustrates an alternate embodiment in which the touch sensitive region of each soft button has been extended as described above relative to interface 1100, but without the transparency aspects. Therefore in this embodiment the extended button size 1201 is visible to the user as shown. While this approach may be more distracting than the transparent approach described above, it has the advantage of showing the user the actual touch sensitive regions.

Figure 13:
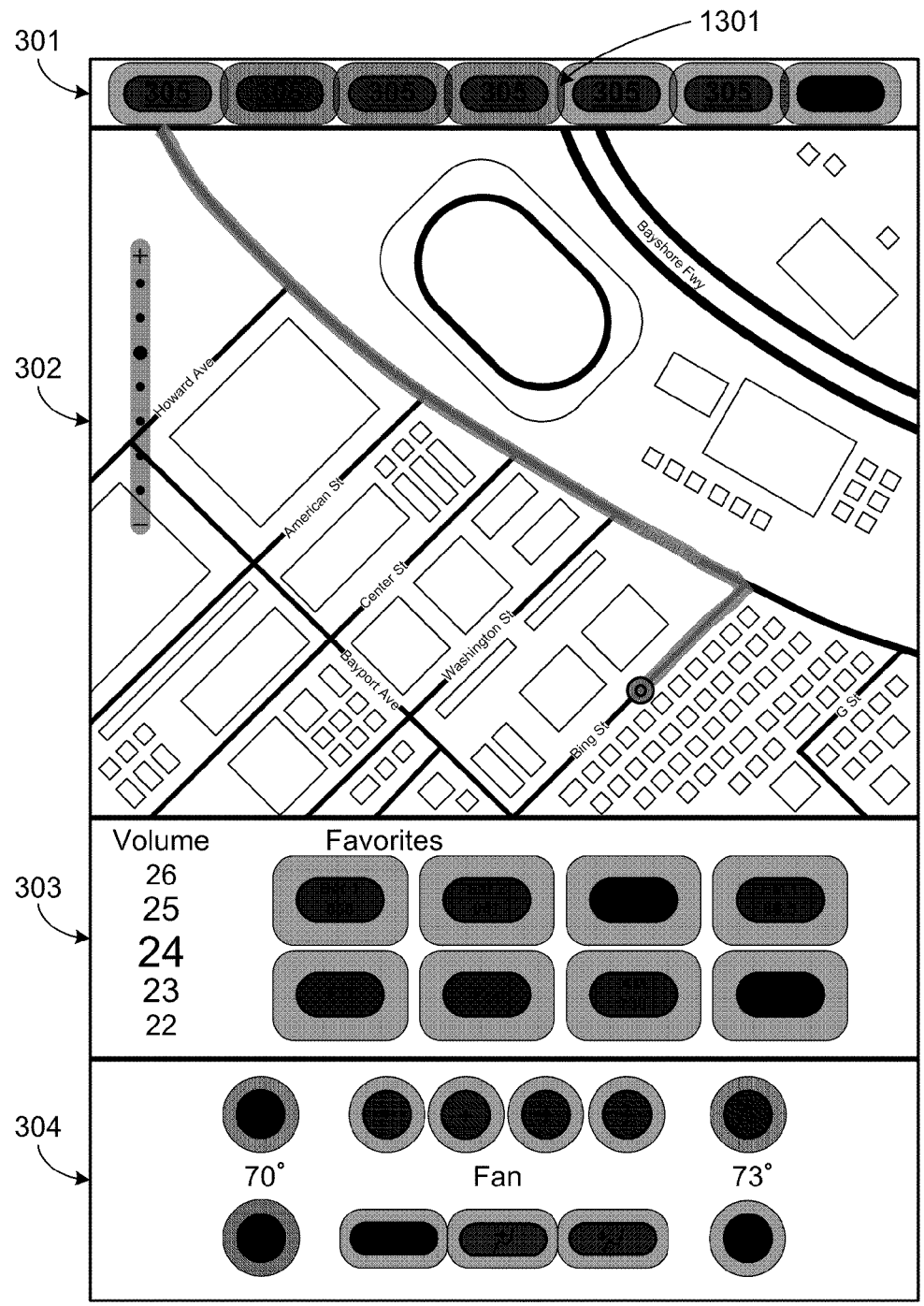
FIG. 13 illustrates the same user interface as shown in FIG. 11, except that the touch-sensitive regions have been extended sufficiently to cause an overlap of some soft buttons.

In some instances the soft buttons may be close enough together on the optimum settings (e.g., FIG. 3) that extending the touch region during interface adaptation causes an overlap of the touch-sensitive region of adjacent soft buttons as illustrated by overlapping region 1301 of FIG. 13. In this instance, a simple proximity-based algorithm is applied by system controller 103 to determine the intended soft button. More specifically, if the user presses a region where two touch-sensitive regions overlap (e.g., region 1301 in FIG. 13), the system controller compares the distance between the center of the area touched by the user and the center of each of the two soft buttons that include that touch-sensitive region. The soft button with the shortest distance to the center of the touched region is selected by controller 103 as the likely target of the user. Preferably when the touch region is extended to such a degree that it overlaps with adjacent touch regions, the extended touch regions are transparent as described above relative to FIG. 11, thereby minimizing user confusion and distraction.

As previously noted, when conditions are optimal, the user is able to accurately touch relatively small regions on the touch-screen interface, and to do so rapidly, i.e., utilizing a rapid tap. However, as conditions deteriorate, not only does the user's touch accuracy decline, but so does the speed at which the user is able to accurately tap the selected region. Additionally, with worsening conditions the driver is more likely to accidently touch regions of the interface, thereby potentially making inadvertent and undesired interface control choices. Therefore in addition to, or as an alternative to, increasing the touch-sensitive regions, the present invention may also be used to adapt tap frequency/duration requirements. For example, when the conditions are optimal, the interface may be configured to only require a tap duration of 0.1 seconds, thus allowing the user to quickly tap the desired control soft button. As conditions worsen, the interface may be configured to increase the time that the user must touch a specific soft button before that touch is recognized by the system controller as a legitimate touch. Therefore in this example, the tap duration may be extended from 0.1 to 0.5 seconds when the driving conditions deteriorate.

It will be appreciated that while increasing the touch sensitive region of a soft button, or increasing the required tap duration, may be used individually, the inventors envision that these two soft button adaptations would be used in concert, thus dramatically improving the ability of the driver/passenger to utilize the user interface as driving conditions change.

Figure 14:
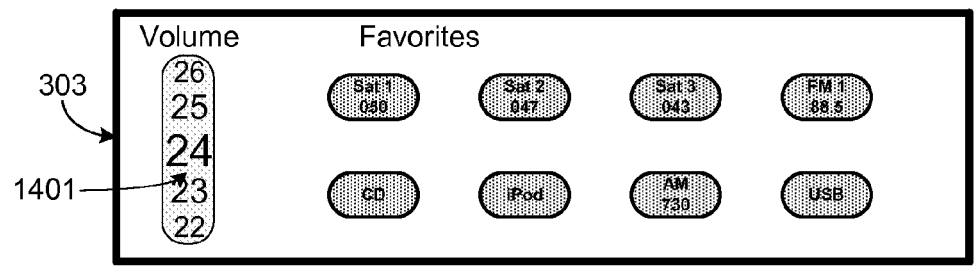
FIG. 14 illustrates a particular interface zone in its non-adapted configuration, i.e., configured for optimal interface use.
Figure 15:
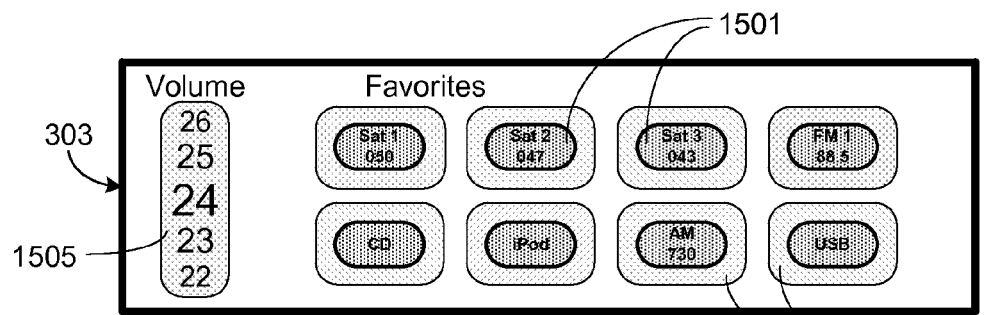
FIG. 15 illustrates the interface zone shown in FIG. 14, adapted to compensate for non-optimal interface operating conditions.
Figure 16:
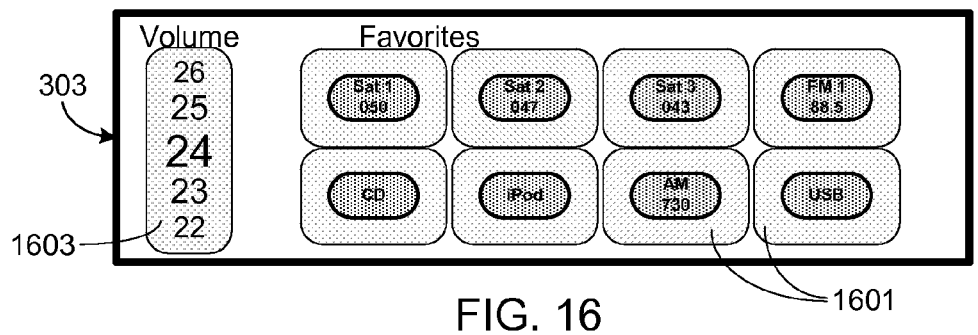
FIG. 16 illustrates the interface zone shown in FIG. 15, adapted to compensate for a further deterioration in interface operating conditions.

As previously noted with respect to FIG. 2, the inventors envision that the touch sensitive region of a soft button, and/or the tap duration, may be varied incrementally over a range of conditions, or that the system may be configured to differentiate between only two conditions, i.e., optimal and non-optimal. An exemplary system in which multiple configurations are utilized over a range of conditions is illustrated in FIGS. 14-16, these figures illustrating three different adaptations of zone 303 of interface 300. It should be understood that these figures are only meant to illustrate various degrees of interface adaptation, and therefore the degree to which the touch sensitive regions or the tap durations change should not be considered as limits or best mode configurations.

In FIG. 14, interface zone 303 is shown in its non-adapted configuration, i.e., configured for optimal interface use. In this configuration, associated with each soft button is a tap duration 'x' (e.g., 0.2 seconds). FIG. 15 shows the same zone adapted to compensate for non-optimal interface operating conditions. As shown, each soft button 1501 has an enlarged touch sensitive region 1503. Similarly, volume slide control 1401 has an extended touch sensitive region 1505. Tap duration has been increased to 2×, e.g., to 0.4 seconds. Assuming that the conditions necessary for interface operation continue to deteriorate, the touch sensitive region for each button 1501 and the slide control 1401 further expand as illustrated by regions 1601 and 1603, respectively, shown in FIG. 16. Similarly, the tap duration also increases to 2.5×, e.g., to 0.5 seconds. Note that while these figures illustrate a transparent approach to the extended touch sensitive regions, as described above relative to FIG. 11, a non-transparent approach such as that illustrated in FIG. 12 is similarly applicable.

As previously noted relative to FIG. 2, the inventors envision that the combination of different deteriorating conditions may, and will most likely, yield a level of interface adaptation that is different from the level of adaptation required when only a subset of these same deteriorating conditions exist. For example, traveling at a high speed over a very bumpy road will make it more difficult to use the vehicle interface than simply traveling at a high speed, resulting in different levels of interface adaptation. Accordingly, the system is preferably configured to adapt the user interface in such a way that the combination of driving, road and weather conditions is taken into account.

Adaptive Interface Controls

In a typical vehicle interface, the controls associated with each represented vehicle subsystem are predefined, either by the vehicle manufacturer, by a service representative of the vehicle manufacturer, by the user, or by a third party (e.g., technician). As described in detail in co-pending U.S. patent application Ser. No. 12/708,547, filed Feb. 19, 2010, a touch-screen interface, especially a large touch-screen interface, allows the interface to be configured for a specific use or user.

In at least one embodiment of the invention, the controls that are provided on the interface are determined, at least in part, by current vehicle conditions. As such, the interface is able to show those controls that are most likely to be of interest to the driver/passenger, while eliminating controls that are of minimal, if any, use to the driver/passenger given the present conditions.

Figure 17:
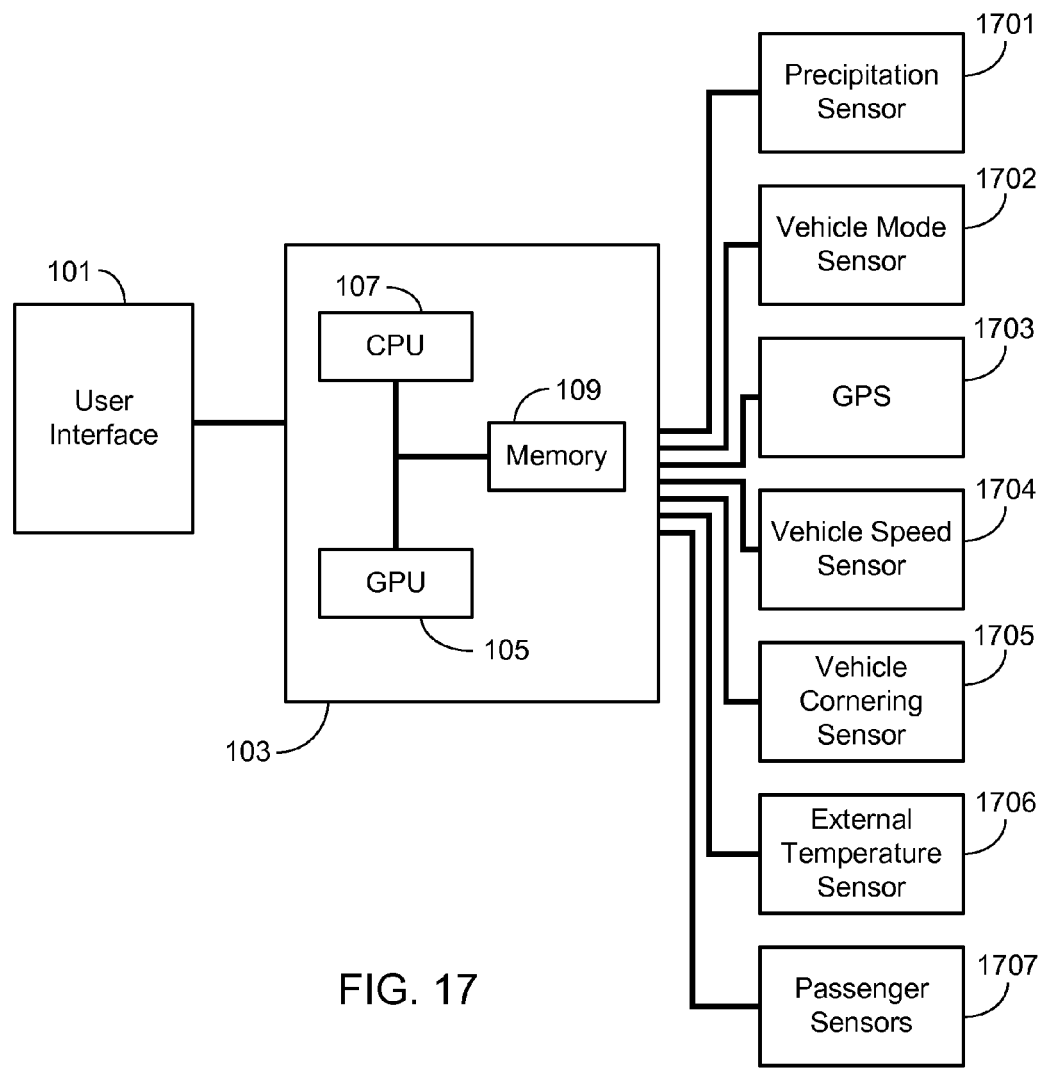
FIG. 17 illustrates a block diagram of a vehicle user interface that determines the controls that are displayed based on vehicle operating conditions.
Figure 18:
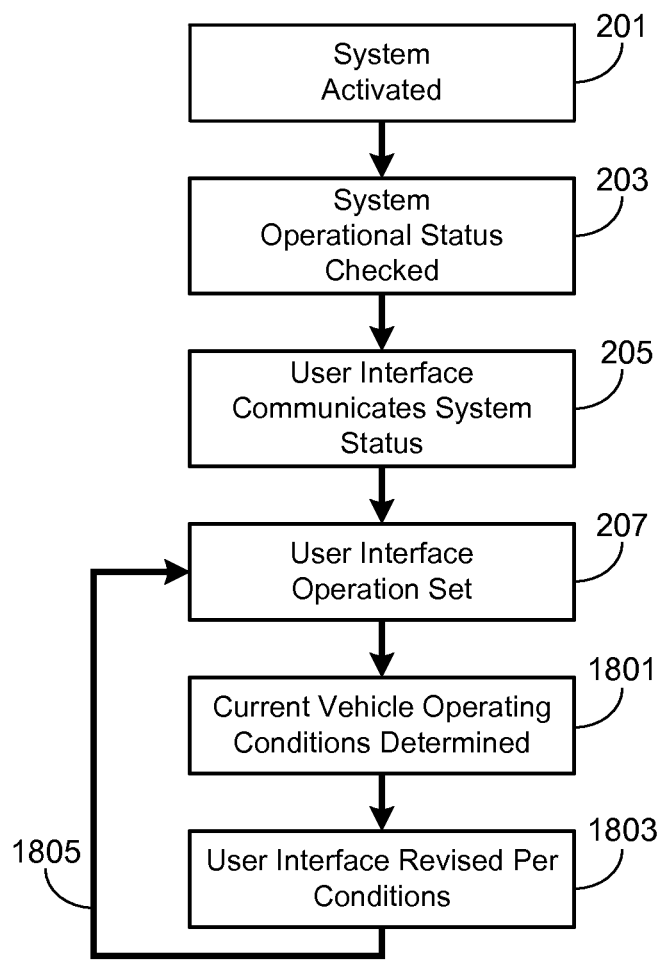
FIG. 18 illustrates the methodology for use with the interface shown in FIG. 17.

FIGS. 17 and 18 illustrate an exemplary system and methodology, respectively, which demonstrate this aspect of the invention. As shown in FIG. 18, initially the system operates in a similar fashion as previously described relative to FIG. 2, including step 207 in which the interface is initially set-up as previously configured by the user, service technician, manufacturer, etc. Once the system is completely operational, system controller 103 obtains current vehicle status from a variety of sensors, e.g., sensors 1701-1707 (step 1801). It will be appreciated that these sensors may be the same sensors as used with other aspects of the invention, or a different set of sensors, or some subset thereof. Using the data gathered from the sensors, system controller 103 determines whether modifications of the interface should be made (step 1803). The types of modifications made by system controller 103, as well as the thresholds necessary to implement these modifications, may be set-up by the user, the vehicle's manufacturer, a service representative of the vehicle's manufacturer, or a third party. Exemplary interface modifications are described below.

Figure 19:
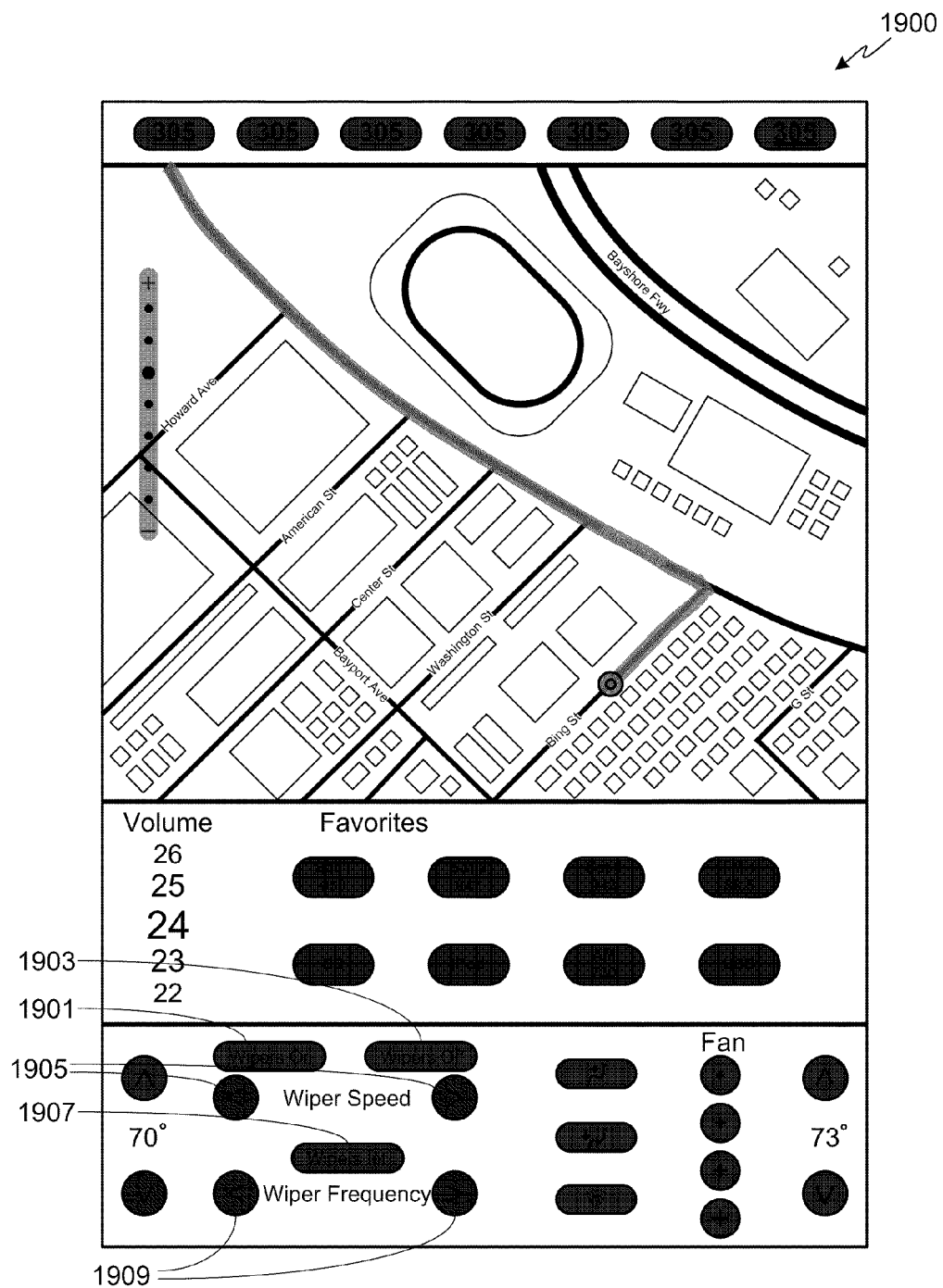
FIG. 19 illustrates a user interface that has been modified in response to detecting a change in precipitation levels.

In a conventional vehicle, the controls necessary to turn on/off the windshield wipers as well as vary the windshield wiper speed are always present. In one configuration of the invention, these controls would be represented by soft buttons on interface 101. When precipitation sensor 1701 determines dry conditions, these controls would not appear on interface 101, thus eliminating a distraction to the driver. Additionally, by eliminating these controls when the system deems them unnecessary, space is freed up on the interface that may be used for other controls, or simply to provide more space for the other subsystems. When precipitation sensor 1701 determines wet driving conditions, system controller 103 reconfigures the interface to include the controls necessary to operate the windshield wipers. For example, FIG. 19 shows an interface 1900, similar to interface 300, for use when the system determines that wet driving conditions are present. Interface 1900 includes various wiper controls, e.g., wiper on soft button 1901, wiper off soft button 1903, wiper speed soft buttons 1905, and wiper intermittent control soft buttons 1907 and 1909. If desired, the wipers may be configured to turn-on at some pre-selected wiper speed when precipitation is first detected.

In at least one configuration, the controls presented on the user interface depend upon the number of occupants within the vehicle. Although a variety of techniques may be used to determine the number, and location, of the occupants, preferably pressure sensitive switches 1707 are mounted within the car seats and used to determine the number and location of the vehicle's passengers. Using this information, the information displayed on the user interface may be varied. For example, while interface 300 includes dual temperature controls, i.e., a driver temperature control 309 and a passenger temperature control 311, the system may adapt to only having the driver present by only displaying control 309 and eliminating control 311. Other interface adaptations based on the number of vehicle passengers are envisioned, for example, displaying seat adjustment controls on the interface, but only for those seats containing passengers.

Figure 20:
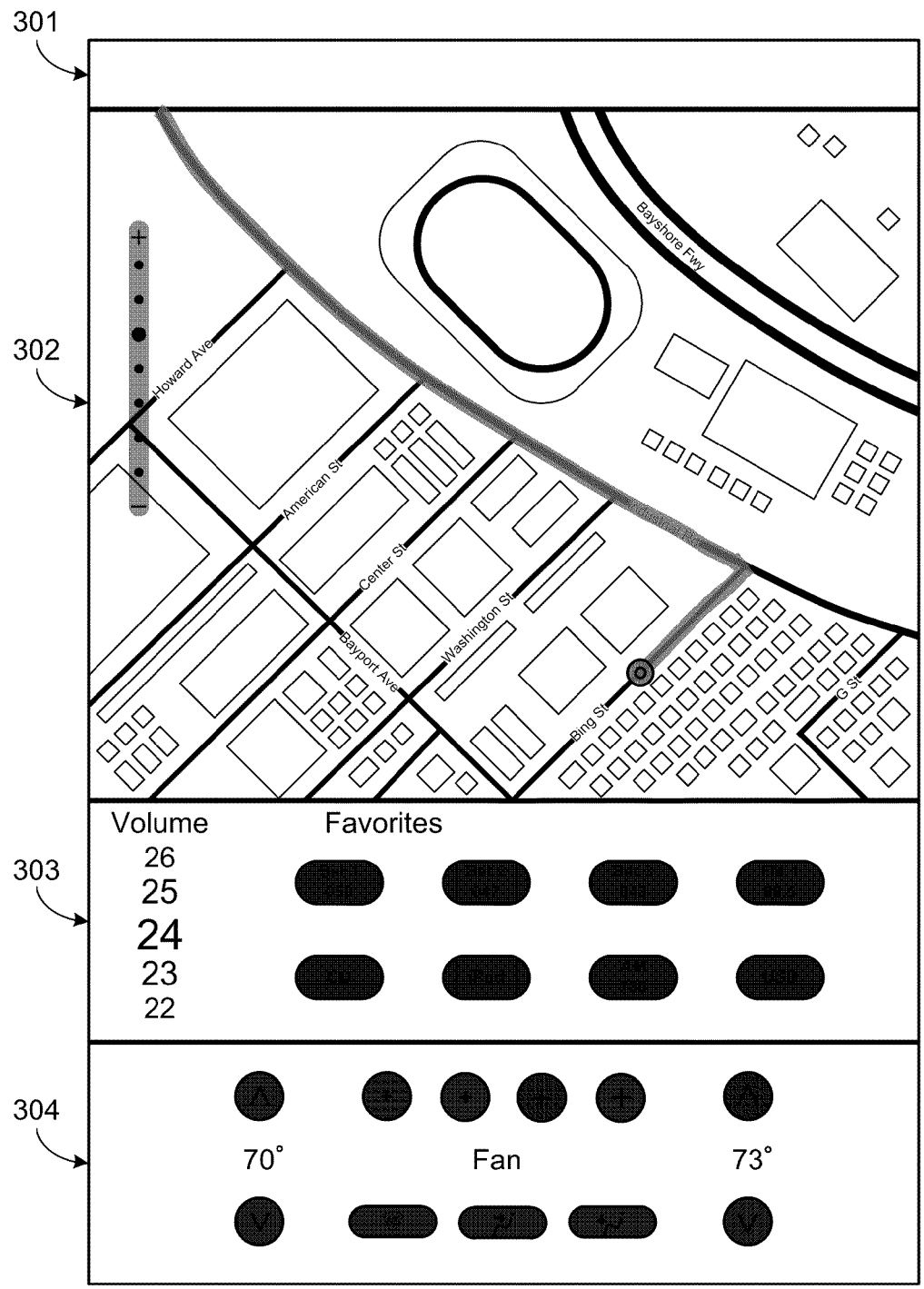
FIG. 20 illustrates a user interface similar to that shown in FIG. 3.
Figure 21:
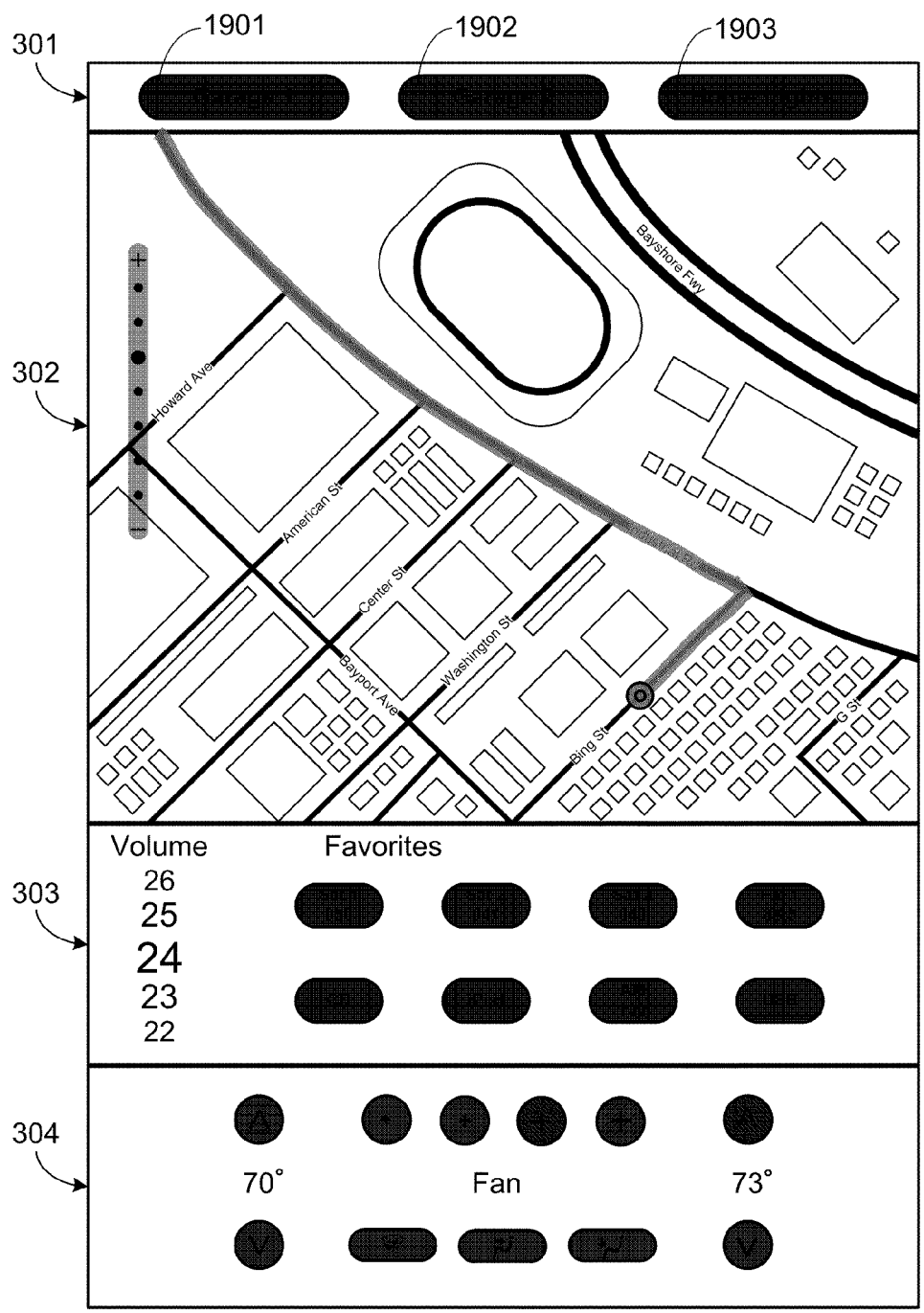
FIG. 21 illustrates the user interface of FIG. 20 after the system controller determines that the vehicle is in close proximity to the user's home.

Conventional vehicles often include functionality that allows the user to activate one or more external systems, for example a garage door(s), home lighting, home security, etc. This functionality is included as a convenience to the user, allowing the user to activate these external systems without requiring them to carry a separate controller (e.g., a garage door opener) or to leave the confines of their vehicle when they activate the external system. When the user activates one of these control buttons, typically included on a visor or rear view mirror keypad, a relatively low power RF transmitter within the vehicle transmits the necessary signal to activate the desired device, the RF transmitter preset for a specific frequency and/or utilizing a preset code. This type of control is necessarily short range, thus avoiding interference with other systems as well as minimizing the risk of activating a different party's system or inadvertently activating the party's own system when they are not present. In one configuration of the invention, soft buttons that represent these features are only present when system controller 103 determines that the vehicle is in close proximity to the location where control is desired (e.g., the user's home). System controller 103 determines this proximity using data from GPS system 1703 along with preset 'home' coordinates. FIGS. 20 and 21 illustrate this aspect of the invention, FIG. 20 showing an interface similar to interface 300 except for the lack of soft buttons within zone 301. When system controller 103 determines that the vehicle is close to, and within range of, the home location, the interface changes as shown in FIG. 19, this interface including three soft buttons 1901-1903 within zone 301 labeled, respectively, "Garage 1", "Garage 2" and "Home Lights". Given the configurable nature of the touch-screen interface, preferably the user is able to label these three buttons as desired, and thus the indicated labels are only for illustration purposes. It will be appreciated that a fewer, or greater, number of such soft buttons may be included on the interface without departing from the invention.

In at least one configuration, the interface adapts to the style of driving, and more specifically, adapts to an aggressive style of driving versus a non-aggressive style of driving. When system controller 103 detects an aggressive driving style, the interface adapts, for example by altering the controls and displays shown on the interface. It will be appreciated that while a central interface was shown in previous figures, the invention is equally applicable to other, configurable vehicle interfaces. For example, the vehicle may include a pair of interfaces, one positioned approximately between the driver's seat and the front passenger seat, and the other interface positioned directly in front of the driver, this interface providing driver centric display information (e.g., speedometer, engine/motor temperature, battery state-of-charge, tachometer, etc.). In this embodiment, aggressive driving may be determined using any of several techniques (e.g., monitoring vehicle speed, vehicle acceleration, lateral force, etc.). For example, system controller 103 may make this determination based on vehicle speed alone as provided by sensor 1704 or in concert with lateral motion sensor 1705, sensor 1705 providing a measure of lateral force that may result from hard cornering. Alternately, system controller 103 may make this determination by monitoring a performance mode switch that allows the driver to select between at least a 'normal' driving mode and a 'performance' driving mode. Selection of the 'performance' mode may only change attributes of the interface, or it may change other aspects of the vehicle as well, for example the set-up of the suspension system. Once an aggressive driving style is determined, the interface (or interfaces if the vehicle utilizes multiple configurable interfaces) is adapted to minimize non-essential displays and controls, thereby minimizing driver distractions. Although the non-essential displays/controls may be preset by the manufacturer, preferably the user makes this determination. In some embodiments, minimization of non-essential displays/controls simply means dimming the display brightness for these aspects of the interface (e.g., the media controls, climate controls, etc.) relative to the essential interface elements (e.g., speedometer, etc). Alternately, or in addition to dimming, the display interface for non-essential vehicle subsystems may be simplified, for example by including a subset of the controls that allows the user limited subsystem control while minimizing interface distractions. For example, the audio entertainment subsystem zone 303 of interface 300 may be changed to only show the volume control. Alternately, in some embodiments one or more display elements or controls of non-essential subsystems are altogether eliminated from the user interface. In addition to eliminating, simplifying and/or minimizing non-essential displays/controls, preferably the interface(s) is adapted to highlight those controls that the driver is likely to require or use during this driving period, for example the speedometer, engine/motor temperature, lap timer, battery state-of-charge gauge, tachometer, etc. The displays and/or controls that are highlighted in this driving mode may be highlighted by increasing the display brightness for these displays/controls relative to non-essential displays/controls. Alternately, or in addition to varying display brightness, the size of the affected displays/controls may be increased to highlight their significance relative to the non-essential interface elements.

It should be understood that identical element symbols used on multiple figures refer to the same component, or components of equal functionality. Additionally, the accompanying figures are only meant to illustrate, not limit, the scope of the invention and should not be considered to be to scale.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of configuring a vehicle interface, the method comprising the steps of:

providing a touch-screen display interface within a vehicle;
displaying at least one vehicle subsystem interface on said touch-screen display interface, wherein said at least one vehicle subsystem interface corresponds to a particular vehicle subsystem, wherein said at least one vehicle subsystem interface is comprised of displayed information corresponding to said particular vehicle subsystem, and wherein said at least one vehicle subsystem interface is comprised of a plurality of touch-sensitive soft buttons corresponding to a plurality of controllable functions associated with said particular vehicle subsystem, wherein each of said plurality of touch-sensitive soft buttons corresponds to a touch-sensitive region on said touch-screen display interface;
monitoring at least one vehicle condition utilizing at least one vehicle condition sensor;
communicating an output from said at least one vehicle condition sensor to a system controller, wherein said system controller is coupled to said touch-screen display interface and provides configuration instructions to said touch-screen display interface;
configuring a set of touch properties corresponding to each touch-sensitive region of said plurality of touch-sensitive soft buttons in response to said output from said at least one vehicle condition sensor, wherein said set of touch properties corresponds to a tap duration required to register input for each individual touch of said touch-sensitive regions, wherein said configuring step further comprises the step of modifying said tap duration from a first value to a second value when said at least one vehicle condition deteriorates below a preset level; and
wherein said system controller periodically performs said configuring step during vehicle operation and as vehicle conditions change.

2. The method of claim 1, wherein said step of configuring said set of touch properties further comprises the step of expanding an area associated with each touch-sensitive region as said at least one vehicle condition deteriorates.

3. The method of claim 2, wherein said step of expanding said area associated with each touch-sensitive region is performed in stages, with each stage of further expanding area corresponding to further deterioration of said at least one vehicle condition.

4. The method of claim 2, wherein said step of expanding said area associated with each touch-sensitive region further comprises the step of expanding said area transparently so that the expanded area associated with each touch-sensitive region is not visible when viewing said touch-screen display interface.

5. The method of claim 2, wherein said step of expanding said area associated with each touch-sensitive region further comprises the step of expanding a soft button graphic visible on said touch-screen display interface in proportion to said expanded area.

6. The method of claim 1, wherein said step of configuring said set of touch properties further comprises the step of increasing said tap duration as said at least one vehicle condition deteriorates.

7. The method of claim 6, wherein said step of increasing said tap duration is performed in stages, with each stage of further increasing tap duration corresponding to further deterioration of said at least one vehicle condition.

8. The method of claim 1, wherein said at least one vehicle condition includes vehicle cabin vibration levels, wherein said at least one vehicle condition sensor further comprises a vibration sensor, and wherein said step of monitoring said at least one vehicle condition further comprises the step of detecting changes in said vehicle cabin vibration levels, wherein increasing vehicle cabin vibration levels corresponds to deterioration of said at least one vehicle condition.

9. The method of claim 1, wherein said at least one vehicle condition includes vehicle cornering force, wherein said at least one vehicle condition sensor further comprises a steering wheel position sensor, and wherein said step of monitoring said at least one vehicle condition further comprises the step of detecting changes in said vehicle cornering force, wherein increasing vehicle cornering force corresponds to deterioration of said at least one vehicle condition.

10. The method of claim 1, wherein said at least one vehicle condition includes vehicle cornering force, wherein said at least one vehicle condition sensor further comprises a wheel position sensor, and wherein said step of monitoring said at least one vehicle condition further comprises the step of detecting changes in said vehicle cornering force, wherein increasing vehicle cornering force corresponds to deterioration of said at least one vehicle condition.

11. The method of claim 1, wherein said at least one vehicle condition includes lateral force applied to said vehicle, wherein said at least one vehicle condition sensor further comprises a lateral force sensor, and wherein said step of monitoring said at least one vehicle condition further comprises the step of detecting changes in said lateral force, wherein increasing lateral force corresponds to deterioration of said at least one vehicle condition.

12. The method of claim 1, wherein said at least one vehicle condition includes vehicle speed, wherein said at least one vehicle condition sensor further comprises a vehicle speed sensor, and wherein said step of monitoring said at least one vehicle condition further comprises the step of detecting changes in said vehicle speed, wherein increasing vehicle speed corresponds to deterioration of said at least one vehicle condition.

13. The method of claim 1, wherein said at least one vehicle condition includes precipitation levels, wherein said at least one vehicle condition sensor further comprises a precipitation sensor, and wherein said step of monitoring said at least one vehicle condition further comprises the step of detecting changes in said precipitation level, wherein increasing precipitation levels corresponds to deterioration of said at least one vehicle condition.

14. The method of claim 13, wherein said at least one vehicle condition includes external ambient temperature, wherein said at least one vehicle condition sensor further comprises an external ambient temperature sensor, and wherein said step of monitoring said at least one vehicle condition further comprises the step of detecting changes in said external ambient temperature along with changes in said precipitation level, wherein increasing precipitation levels and external ambient temperatures below freezing correspond to deterioration of said at least one vehicle condition.

15. The method of claim 2, wherein said at least one vehicle condition includes vehicle cabin vibration levels, wherein said at least one vehicle condition sensor further comprises a vibration sensor, and wherein said step of monitoring said at least one vehicle condition further comprises the step of detecting changes in said vehicle cabin vibration levels, wherein increasing vehicle cabin vibration levels corresponds to deterioration of said at least one vehicle condition.

16. The method of claim 2, wherein said at least one vehicle condition includes vehicle cornering force, wherein said at least one vehicle condition sensor further comprises a steering wheel position sensor, and wherein said step of monitoring said at least one vehicle condition further comprises the step of detecting changes in said vehicle cornering force, wherein increasing vehicle cornering force corresponds to deterioration of said at least one vehicle condition.

17. The method of claim 2, wherein said at least one vehicle condition includes vehicle cornering force, wherein said at least one vehicle condition sensor further comprises a wheel position sensor, and wherein said step of monitoring said at least one vehicle condition further comprises the step of detecting changes in said vehicle cornering force, wherein increasing vehicle cornering force corresponds to deterioration of said at least one vehicle condition.

18. The method of claim 2, wherein said at least one vehicle condition includes lateral force applied to said vehicle, wherein said at least one vehicle condition sensor further comprises a lateral force sensor, and wherein said step of monitoring said at least one vehicle condition further comprises the step of detecting changes in said lateral force, wherein increasing lateral force corresponds to deterioration of said at least one vehicle condition.

19. The method of claim 2, wherein said at least one vehicle condition includes vehicle speed, wherein said at least one vehicle condition sensor further comprises a vehicle speed sensor, and wherein said step of monitoring said at least one vehicle condition further comprises the step of detecting changes in said vehicle speed, wherein increasing vehicle speed corresponds to deterioration of said at least one vehicle condition.

20. The method of claim 2, wherein said at least one vehicle condition includes precipitation levels, wherein said at least one vehicle condition sensor further comprises a precipitation sensor, and wherein said step of monitoring said at least one vehicle condition further comprises the step of detecting changes in said precipitation level, wherein increasing precipitation levels corresponds to deterioration of said at least one vehicle condition.

21. The method of claim 20, wherein said at least one vehicle condition includes external ambient temperature, wherein said at least one vehicle condition sensor further comprises an external ambient temperature sensor, and wherein said step of monitoring said at least one vehicle condition further comprises the step of detecting changes in said external ambient temperature along with changes in said precipitation level, wherein increasing precipitation levels and external ambient temperatures below freezing correspond to deterioration of said at least one vehicle condition.

22. A vehicle user interface system, comprising:
a touch-screen interface display mounted within a vehicle passenger compartment of a vehicle, said touch-screen interface display configured to display at least one vehicle subsystem interface, wherein said at least one vehicle subsystem interface corresponds to a particular vehicle subsystem, wherein said at least one vehicle subsystem interface is comprised of displayed information corresponding to said particular vehicle subsystem, and wherein said at least one vehicle subsystem interface is comprised of a plurality of touch-sensitive soft buttons corresponding to a plurality of controllable functions associated with said particular vehicle subsystem, wherein associated with each of said plurality of touch-sensitive soft buttons is a set of touch properties, wherein said set of touch properties corresponds to a tap duration required to register input for each individual touch of said touch-sensitive regions;
a system controller coupled to said touch-screen interface display, wherein said system controller configures said set of touch properties associated with each of said plurality of touch-sensitive soft buttons, wherein said system controller periodically configures said set of touch properties during vehicle operation; and
a vehicle condition monitor, said vehicle condition monitor periodically communicating at least one current vehicle condition to said system controller, wherein said system controller configures said set of touch properties associated with each of said plurality of touch-sensitive soft buttons in response to said at least one current vehicle condition, and wherein said system controller modifies said tap duration from a first value to a second value when said at least one vehicle condition deteriorates below a preset level.

23. The vehicle user interface system of claim 22, wherein said system controller expands an area associated with each touch-sensitive region when said at least one vehicle condition deteriorates below said preset level.

24. The vehicle user interface system of claim 23, wherein said expanded area associated with each touch-sensitive region is transparent.

25. The vehicle user interface system of claim 22, wherein said system controller expands an area associated with each touch-sensitive region in steps, wherein each step of expanding area corresponds to a different level associated with said at least one vehicle condition.

26. The vehicle user interface system of claim 25, wherein said expanded area associated with each touch-sensitive region is transparent.

27. The vehicle user interface system of claim 22, wherein said system controller increases said tap duration associated with each touch-sensitive region when said at least one vehicle condition deteriorates below said preset level.

28. The vehicle user interface system of claim 22, wherein said system controller increases said tap duration associated with each touch-sensitive region in steps, wherein each step of increasing tap duration corresponds to a different level associated with said at least one vehicle condition.

29. The vehicle user interface system of claim 22, wherein said vehicle condition monitor is comprised of a vibration sensor, wherein said at least one current vehicle condition is comprised of vehicle cabin vibration levels.

30. The vehicle user interface system of claim 22, wherein said vehicle condition monitor is comprised of a steering wheel position sensor, wherein said at least one current vehicle condition is comprised of vehicle turning radius.

31. The vehicle user interface system of claim 22, wherein said vehicle condition monitor is comprised of a wheel position sensor, wherein said at least one current vehicle condition is comprised of vehicle turning radius.

32. The vehicle user interface system of claim 22, wherein said vehicle condition monitor is comprised of a lateral force sensor, wherein said at least one current vehicle condition is comprised of lateral force applied to said vehicle.

33. The vehicle user interface system of claim 22, wherein said vehicle condition monitor is comprised of a vehicle speed sensor, wherein said at least one current vehicle condition is comprised of vehicle speed.

34. The vehicle user interface system of claim 22, wherein said vehicle condition monitor is comprised of a precipitation sensor, wherein said at least one current vehicle condition is comprised of a precipitation level.

35. The vehicle user interface system of claim 34, wherein said vehicle condition monitor is further comprised of an external ambient temperature sensor, wherein said at least one current vehicle condition is further comprised of an external ambient temperature.

36. The vehicle user interface system of claim 23, wherein said vehicle condition monitor is comprised of a vibration sensor, wherein said at least one current vehicle condition is comprised of vehicle cabin vibration levels.

37. The vehicle user interface system of claim 23, wherein said vehicle condition monitor is comprised of a steering wheel position sensor, wherein said at least one current vehicle condition is comprised of vehicle turning radius.

38. The vehicle user interface system of claim 23, wherein said vehicle condition monitor is comprised of a wheel position sensor, wherein said at least one current vehicle condition is comprised of vehicle turning radius.

39. The vehicle user interface system of claim 23, wherein said vehicle condition monitor is comprised of a lateral force sensor, wherein said at least one current vehicle condition is comprised of lateral force applied to said vehicle.

40. The vehicle user interface system of claim 23, wherein said vehicle condition monitor is comprised of a vehicle speed sensor, wherein said at least one current vehicle condition is comprised of vehicle speed.

41. The vehicle user interface system of claim 23, wherein said vehicle condition monitor is comprised of a precipitation sensor, wherein said at least one current vehicle condition is comprised of a precipitation level.

42. The vehicle user interface system of claim 41, wherein said vehicle condition monitor is further comprised of an external ambient temperature sensor, wherein said at least one current vehicle condition is further comprised of an external ambient temperature.

\* \* \* \* \*